(12) United States Patent
Kirschner et al.

(10) Patent No.: US 12,469,061 B2
(45) Date of Patent: *Nov. 11, 2025

(54) DUAL-CAMERA APPARATUS FOR DERIVING DIMENSIONAL MEASUREMENTS AND METHOD OF PERSONALIZING LENS SELECTION

(71) Applicant: EYELATION, INC., Tinley Park, IL (US)

(72) Inventors: Bradley Kirschner, Tinley Park, IL (US); Brandon Hass, Chicago, IL (US); Kiet Pham, Bolingbrook, IL (US)

(73) Assignee: EYELATION, INC., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,683

(22) Filed: Jun. 4, 2019

(65) Prior Publication Data

US 2020/0126140 A1 Apr. 23, 2020

Related U.S. Application Data

(63) Continuation of application No. 14/748,208, filed on Jun. 23, 2015, now Pat. No. 10,339,581, which is a
(Continued)

(51) Int. Cl.
*H04N 23/45* (2023.01)
*G06Q 30/0601* (2023.01)
(Continued)

(52) U.S. Cl.
CPC ..... *G06Q 30/0621* (2013.01); *G06Q 30/0631* (2013.01); *G06Q 30/0643* (2013.01);
(Continued)

(58) Field of Classification Search
CPC .. G01B 21/042; G01B 11/02; G06Q 30/0621; G06Q 30/06; H04N 5/247; H04N 17/00; H04N 5/225
(Continued)

(56) References Cited

U.S. PATENT DOCUMENTS 4,491,725 A 1/1985 Pritchard
4,730,260 A 3/1988 Mori et al.
(Continued)

FOREIGN PATENT DOCUMENTS

GB 2361374 4/2000
GB 2449855 6/2007
(Continued)

OTHER PUBLICATIONS

International Search Report on Patentability dated Jul. 15, 2011 in connection with PCT/US2011/04411.
(Continued)

*Primary Examiner* — William C Vaughn, Jr.
(74) *Attorney, Agent, or Firm* — STEPTOE LLP; Scott Richey

(57) ABSTRACT

A dual-camera apparatus derives dimensional measurements of an object. The apparatus comprises a pair of digital cameras each comprising a lens and capable of producing an image of the object. A ratio of known distance units to pixels is established for the apparatus and applied to images generated by each of the digital cameras. The lenses are spaced apart at a first known distance. In operation, the first known distance and the established ratio provide a trigonometric basis for ascertaining distances between at least two features on the object. A calibration template can be used to establish the ratio of known distance units to pixels. The object can be a human subject, and the at least two features can be associated with the human subject's eyes, the human
(Continued)

subject's feet, and/or other human body parts. The disclosure also relates to a method in aiding in lens selection.

20 Claims, 23 Drawing Sheets

Related U.S. Application Data continuation-in-part of application No. 14/311,890, filed on Jun. 23, 2014, now abandoned, and a continuation-in-part of application No. 13/183,532, filed on Jul. 15, 2011, now abandoned.

(60) Provisional application No. 62/091,626, filed on Dec. 15, 2014, provisional application No. 61/838,304, filed on Jun. 23, 2013, provisional application No. 61/372,559, filed on Aug. 11, 2010, provisional application No. 61/364,895, filed on Jul. 16, 2010.

(51) Int. Cl.
  *H04N 23/50* (2023.01)
  *H04N 23/90* (2023.01)
  *G01B 21/04* (2006.01)
(52) U.S. Cl.
  CPC ............ *H04N 23/45* (2023.01); *H04N 23/50* (2023.01); *H04N 23/90* (2023.01); *G01B 21/042* (2013.01)
(58) Field of Classification Search
  USPC .......................................................... 348/78
  See application file for complete search history.

(56) References Cited

U.S. PATENT DOCUMENTS

| | | | |
|---|---|---|---|
| 4,823,285 A | 4/1989 | Blancato | |
| 5,805,257 A | 9/1998 | Hagler | |
| 5,930,759 A | 7/1999 | Moore | |
| 6,083,353 A * | 7/2000 | Alexander, Jr. | G01C 21/00 202/158 |
| 6,095,650 A | 8/2000 | Gao et al. | |
| 6,142,628 A | 11/2000 | Saigo | |
| 6,508,553 B2 | 1/2003 | Gao et al. | |
| 6,535,223 B1 | 3/2003 | Foley | |
| 6,583,792 B1 | 6/2003 | Agnew | |
| 6,847,383 B2 | 1/2005 | Agnew | |
| 6,871,783 B2 | 3/2005 | Kaafarani et al. | |
| 7,184,047 B1 * | 2/2007 | Crampton | G06T 17/00 348/592 |
| 7,222,091 B2 | 5/2007 | Yoshida | |
| 7,292,713 B2 | 11/2007 | Fukuma et al. | |
| 7,384,146 B2 | 6/2008 | Covannon | |
| 8,182,091 B2 | 5/2012 | Foster | |
| 8,340,355 B2 | 12/2012 | Yano | |
| 8,459,792 B2 | 6/2013 | Wilson et al. | |
| 2001/0026351 A1 | 10/2001 | Gao et al. | |
| 2004/0004633 A1 | 1/2004 | Perry et al. | |
| 2004/0064376 A1 | 4/2004 | Yoshida | |
| 2004/0078237 A1 | 4/2004 | Kaafarani et al. | |
| 2005/0033604 A1 | 2/2005 | Hogan | |
| 2006/0100938 A1 | 5/2006 | Fukuma | |
| 2006/0238550 A1 * | 10/2006 | Page | G06F 1/163 345/661 |
| 2006/0290885 A1 * | 12/2006 | Covannon | A61F 9/008 607/89 |
| 2007/0061251 A1 | 3/2007 | Watkins | |
| 2008/0021827 A1 | 1/2008 | Wilis | |
| 2008/0288369 A1 | 11/2008 | Hunter | |
| 2009/0087031 A1 * | 4/2009 | Yano | H04N 5/247 382/106 |
| 2009/0128579 A1 * | 5/2009 | Xie | G02C 13/005 345/634 |
| 2010/0033678 A1 | 2/2010 | Foster | |
| 2010/0070307 A1 | 3/2010 | Sinvhal-Sharma | |
| 2011/0085789 A1 * | 4/2011 | Campbell | G03B 35/00 396/325 |
| 2011/0267578 A1 | 11/2011 | Wilson | |

FOREIGN PATENT DOCUMENTS

| | | | |
|---|---|---|---|
| JP | 3976925 B2 * | 9/2007 | ............ A61B 3/112 |
| WO | 0219235 | 3/2002 | |

OTHER PUBLICATIONS

Examination Report issued Aug. 8, 2011 in connection with New Zealand Application 594103.
Examination Report dated Aug. 20, 2012 in connection with Australian Application No. 2011204796.

\* cited by examiner

Help & Info   My Account   Logout

Welcome [e1@aol.net]

Order Process > Take Photo > Select Eyewear > Add Prescription > Add Lens > Confirm Order Please Insert your Prescription into the scanner as shown below

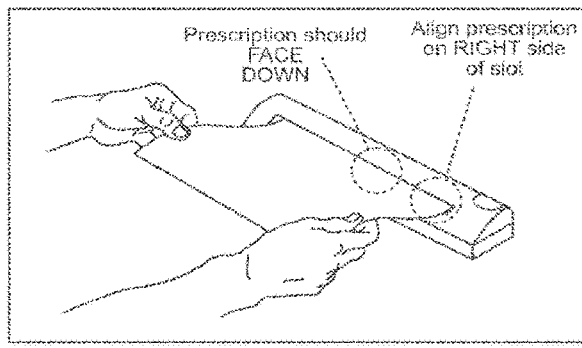

Click here to preview your prescription after image selection is completed

[ Accept ]  [ Rescan ]  [ Back ]

FIG. 2K

Help & Info   My Account   Logout

Welcome [e1@aol.net]

Order Process > Take Photo > Select Eyewear > Add Prescription > Add Lens > Confirm Order Select Lens Type ○ Single Vision
  For one clear viewing distance. Distance, reading, OR computer glasses.

○ Bifocal
  Two viewing fields, for reading and distance vision. The reading aread is separated by a visible line. Can be hard to adapt to since vision is limited, only distance OR near images can be viewed. No intermediate vision.

○ Trifocal
  Three viewing fields, for reading, arms-length, and distance vision. Each area is separated by a visible line. Can be difficult to get used to since each area is only for a set distance away.

○ Progressive
  Continuous vision, from a distance, intermediate (including computer and grocery store shelves) all the way through to reading. The most technologically advanced lenses made today. No visible lines.

[ Back ]                                                      [ Next ]

FIG.2L

Help & Info    My Account    Logout

Welcome [e1@aol.net]

Order Process > Take Photo > Select Eyewear > Add Prescription > Add Lens > Confirm Order Select Lens Material ○ Trivex
Trivex is a new plastic lens material that is being used as a substitute for polycarbonate lenses. Trivex is optically superior to polycarbonate and it is lighter. Like polycarbonate it provides 100% UV protection and it is extremely durable. Most importantly, Trivex is a great substitute for polycarbonate lenses that need to be tinted, because Trivex can be easily tinted but polycarbonate cannot. Trivex is much better suited for tinting and is an excellent choice for rimless mdrill mounted frames.

○ High Index
High index lenses are good for people with prescriptions over +/-4.00 sphere, because they are thinner and lighter. Thinner lenses have three advantages: the do not look "thick", your eyes look natural when seen by others, and they are lighter.

○ Hard Resin (plastic)
Hard resin lenses are good for everyday use. These lenses have the least distortion of any non-glass lens

[Back]                                [Next]

FIG. 2M

Help & Info    My Account    Logout

Welcome [e1@aol.net]

Order Process > Take Photo > Select Eyewear > Add Prescription > Add Lens > Confirm Order Lens Recommendation ○                    GOOD
Product      Basic Hard Resin Single Vision              Price: $49.00
Description  Good quality, good value generic lenses. This lens is not compatible with fully rimless frames.

○                    BETTER
Product      Better Hard Resin Single Vision             Price: $60.00
Description  Thinner and lighter, this lens is surfaced to be custom made for your frame and prescription. This lens is not compatible with fully rimless frames.

○                    BETTER
Product      Better Trivex Single Vision                 Price: $99.00
Description  While Trivex has a slightly lower refractive index than polycarbonate, it's specific gravity, makes it the lightest of any lens material available today. This means the lens may be a little thicker than polycarbonate but similar in weight. However it is optically superior to polycarbonate lens, meaning it is much less distortive. Triview is much better suited for tinting and is an excellent choice for rimless drill mounted frames.

[Back]                                [Next]

FIG. 2N

Help & Info    My Account    Logout
Welcome [e1@aol.net]

Order Process > Take Photo > Select Eyewear > Add Prescription > Add Lens > Confirm Order Anti Reflective
○ Crizal Avance™ - ADD - $74.95
○ Zeiss Anti Reflective - ADD - &74.95
Photocromic and Color Options
○ Fashion Tints - ADD - $7.00
○ Sunglass Tints - ADD - $8.00
○ Gradient Tint - ADD - $8.00
○ Photochromic - ADD - $8.00
○ Polarized (Standard) - ADD - $16.00
○ Polarized (Colors) - ADD - $17.00
○ Full Mirror Coating - ADD - $24.95
UV and Scratch
☐ 100% UV Coating - ADD - $1.00
☐ Scratch Resistance - ADD - $12.95
Other Options
☐ Fitting Adjustments - ADD - $1.00
☐ Extended Warranty - ADD - $49.95

[Back]                                        [Next]

FIG. 2O

Help & Info    My Account    Logout
Welcome [e1@aol.net]

Order Process > Take Photo > Select Eyewear > Add Prescription > Add Lens > Confirm Order Confirm Order

| Name your frame package: | | $88.95 |
| FRAME ⦿ PURCHASE ○ RESERVE FOR $39.95 | | $39.95 |
| Kenmark Group 230454 Metal Frame Color : Brown | | |
| LENS | | $49.00 |
| Basic Hard Resin Single Vision GOOD | | |

SUB TOTAL
$177.90

TAXES AND
SHIPPING OPTION
APPLIED DURING
CHECKOUT

[Back]                                        [Next]

DUAL-CAMERA APPARATUS FOR DERIVING DIMENSIONAL MEASUREMENTS AND METHOD OF PERSONALIZING LENS SELECTION

CROSS-REFERENCE TO RELATED APPLICATIONS

This application is a continuation of U.S. patent application Ser. No. 14/748,208 filed Jun. 23, 2015 entitled "Dual-Camera Apparatus and Method for Deriving Dimensional Measurements" which is a continuation-in-part of U.S. patent application Ser. No. 14/311,890 filed Jun. 23, 2014 entitled "Dual-Camera Apparatus and Method for Deriving Dimensional Measurements" which is related to and claims priority from U.S. Provisional Application No. 61/838,304 filed Jun. 23, 2013 also entitled "Dual-Camera Apparatus and Method for Deriving Dimensional Measurements." U.S. patent application Ser. No. 14/748,208 is a continuation-in-part of U.S. patent application Ser. No. 13/183,532 filed Jul. 15, 2011 entitled "Method of Providing Prescription Safety Eyewear" which is related to and claims priority from U.S. Provisional Patent Application No. 61/364,895, filed Jul. 16, 2010 entitled "Method and Apparatus for Providing Prescription Eyewear" and U.S. Provisional Patent Application No. 61/372,559, filed Aug. 11, 2010 entitled "Method and Apparatus for Providing Prescription Safety Eyewear". U.S. patent application Ser. No. 14/748,208 claims priority benefits from U.S. Provisional Patent Application No. 62/091,626 filed Dec. 15, 2014 entitled "Dual-Camera Apparatus for Deriving Dimensional Measurements and Method of Personalizing Lens Selection." Each application is hereby incorporated by reference in its entirety.

FIELD OF THE INVENTION

The present disclosure relates to measurement devices and, in particular, to an apparatus that employs two cameras spaced apart at a known distance, which measures and facilitates the determination of the dimensions between two or more features of an object or a human subject. The disclosure also relates to a method that aids individuals in selecting the proper and/or desired lens(es) for their needs and/or wants.

This disclosure also relates generally to the provision of prescription eyewear and more specifically to the provision of prescription safety eyewear to employees for use in the workplace.

BACKGROUND OF THE INVENTION

Many workplaces require employees to wear safety glasses at the workplace. This requirement is generally a matter of worker safety but is also usually required by state and federal law. Workers who need corrective lenses have a choice of wearing prescription safety eyewear or wearing bulky, usually uncomfortable, safety goggles over their regular prescription eyewear. Many workers who need corrective lenses prefer to wear prescription safety eyewear for reasons of at least comfort and appearance. Accordingly, there is a need for prescription safety eyewear for use in the workplace.

Many employers, therefore, provide prescription safety eyewear as an employment benefit, paying for some or all of the cost of such eyewear. Conventionally, however, employees have to obtain their own prescription eyewear and submit the cost for reimbursement, which is inconvenient for both the employer and the employee. For example, administrative difficulties arise for the employer in tracking eligibility for benefits. Employees might resent having to spend personal time obtaining company-required equipment. One alternative is to have employees order from a catalog, which presents problems as to fit of the eyewear on the employee. Another alternative is to have an eyewear seller come to the place of employment for selection and fitting of prescription safety eyewear, which does not work well for employees who, for example, are assigned to a late shift or who are absent from the plant on vacation or on business on the day the seller is present at the place of employment.

In fitting apparel to be worn by persons performing work in potentially hazardous settings, such as a factory, plant, or construction site, it is important to have the ability to conveniently measure the dimensions of the workers' body parts on which the apparel is to be worn. The traditional process of fitting employees with personal protective equipment (PPE) is inefficient and cumbersome. An employee must first interact with a human resources personnel, safety specialists and/or outside vendors to ascertain the required PPE and options for selecting the individual apparel components. For example, a particular factory may require a specific type of safety glasses and/or hard-toed shoes.

In the traditional process, once the employer specifies the required complement of PPE, the employee normally has choices regarding the particular design aspects of the individual components. In the case of hard-toed protective shoes, for example, an employee would normally select their size, color and style. One way for an employee to be outfitted with PPE is to visit a company or commercial store to be measured and then make selections. Another method some companies employ is to direct their employees to websites offering selections once the appropriate dimensional measurements of the employee have been taken.

Recently, manufacturing facilities and construction sites have used systems that employ a conventional digital camera to ascertain the dimensional measurements of an employee. Since those conventional systems only employ a single camera, a template with known indicia of distances must be placed on or near the human subject during the measurement process. In this way, the dimensional measurements of the human subject's body parts on which the PPE is to be worn can be accurately derived. It would be beneficial if such a template was not needed, as it is often inconvenient to use in the work place.

SUMMARY OF THE INVENTION

The foregoing and other shortcomings of conventional measuring techniques are overcome by a dual-camera apparatus for deriving dimensional measurements of an object. The apparatus comprises a pair of digital cameras each comprising a lens and capable of producing an image of the object. The apparatus establishes a ratio of known distance units to pixels in images generated by each of the digital cameras. The lenses are spaced apart at a first known distance. In operation, the first known distance and the established ratio provide a trigonometric basis for ascertaining distances between at least two features on the object.

In one embodiment, the object is a human subject. At least two features can be associated with the human subject's eyes, the human subject's feet, the human subject's hands, the human subject's head and/or other human body parts.

A system for deriving dimensional measurements of an object comprises:

(a) a housing;
(b) a pair of digital camera lenses encased within the housing and capable of producing an image of the object external to the housing, the lenses spaced apart at a first known distance; and
(c) a calibration template for establishing a ratio of known distance units to pixels in images generated by each of the digital cameras.

In operation, the first known distance and the established ratio provide a trigonometric basis for ascertaining distances between at least two features on the object.

Shortcomings of conventional measuring techniques are also overcome by a method for deriving dimensional measurements of an object. The method comprises:
(a) spacing apart a pair of digital cameras at a first known distance, each of the digital cameras comprising a lens and capable of producing an image of the object;
(b) generating images from each of the digital cameras of a calibration template, thereby establishing a ratio of known distance units to pixels in images generated by the digital cameras; and
(c) ascertaining distances between at least two features on the object using trigonometric calculations based upon the first known distance and the established ratio.

In one embodiment, the object is a human subject. At least two features can be associated with the human subject's eyes, the human subject's feet, and/or other body parts.

A system for an employer to provide safety prescription eyewear to employees involves providing a kiosk at or near a place of employment, allowing employees to access the kiosk virtually to try on various models of frames and to submit prescription information, and causing the prescription safety eyewear to be manufactured and shipped. Employee benefits can be handled at the kiosk as are other options available relating to, for examples, the selected frame, the prescription lenses, and the method of shipping. Payments in excess of the benefit are accounted for by payment at the kiosk or by payroll deduction.

BRIEF DESCRIPTION OF THE DRAWINGS

FIG. 2K is a scanner-prompt screenshot seen by an employee accessing the kiosk of FIG. 1.
FIG. 2L is a lens options screenshot seen by an employee accessing the kiosk of FIG. 1.
FIG. 2M is a lens material options screenshot seen by an employee accessing the kiosk of FIG. 1.
FIG. 2N is another lens recommendations screenshot seen by an employee accessing the kiosk of FIG. 1.
FIG. 2O is yet another further options screenshot seen by an employee accessing the kiosk of FIG. 1.
FIG. 2P is a confirmation of selection screenshot seen by an employee accessing the kiosk of FIG. 1.
FIG. 14 is a screenshot of an initial survey page of a lens selection program.

DETAILED DESCRIPTION OF PREFERRED EMBODIMENT(S)

Figure 1:
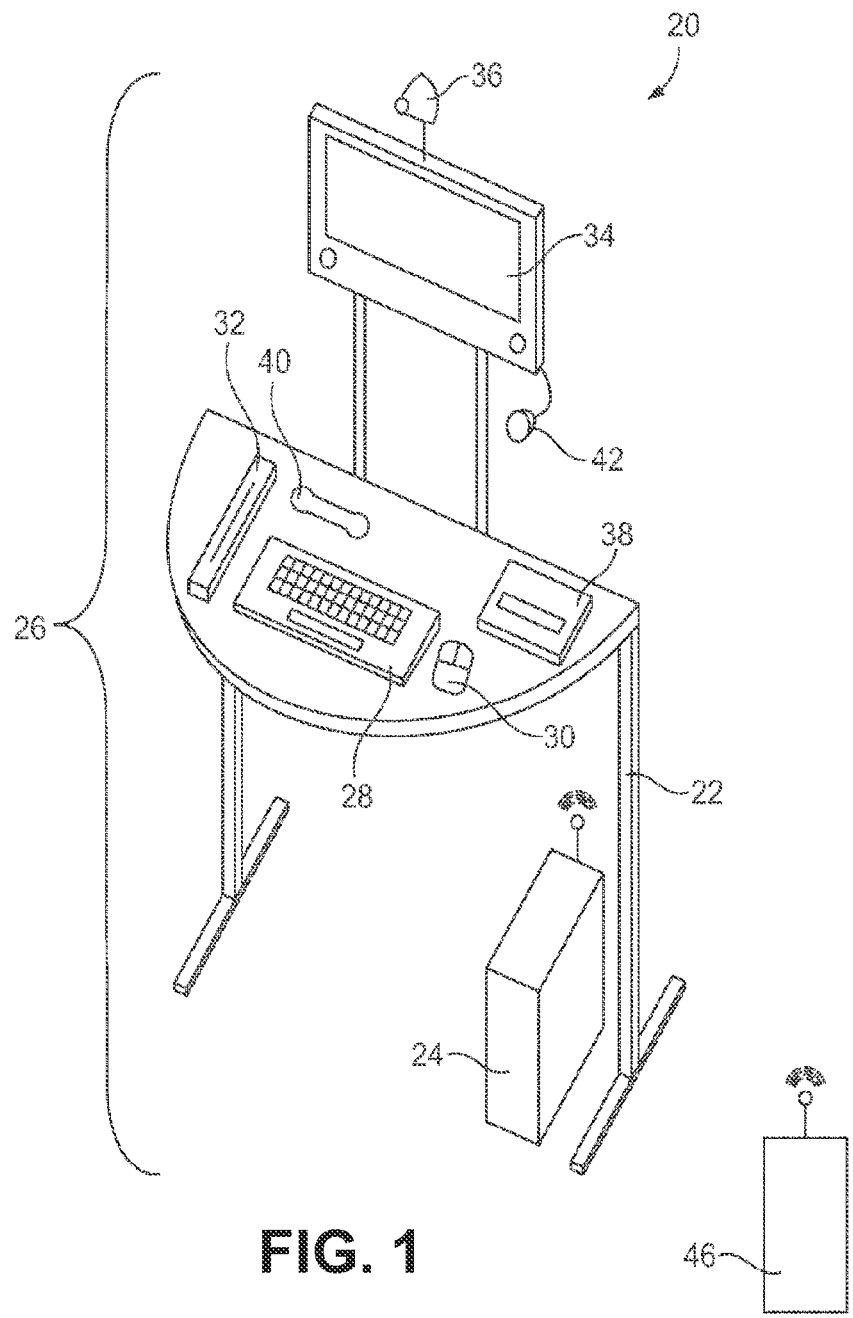
FIG. 1 is a perspective view of a kiosk.

Turning first to FIG. 1, a system comprises kiosk 20. Kiosk 20 comprises frame 22, central processing unit 24, and computer peripherals 26 which can include keyboard 28, mouse 30, scanner 32, display 34, camera 36, and printer 38. Computer peripherals 26 can be set on, mounted on, connected to, or nearby frame 22. Computer peripherals 26 can be coupled to CPU 24 wirelessly, as shown, or by hard wires. CPU 24 can be connected to the Internet by a wireless connection, as shown, or by hard wire. The Internet connection is preferably a broad-band connection such as DSL or T1. Alternatively, CPU 24 can connect to the employer's intranet. Also included with kiosk 20 is a fitting tool, template 40, which is used for fitting.

Kiosk 20 can also have microphone 42 for voice-activated commands, in which case CPU 24 is programmed with voice-activation software. The following description assumes the entry of commands using keyboard 28 and mouse 30, however the same results can be used by programming CPU 24 to recognize voice commands received through microphone 42.

Mouse 30 can be replaced by a touchpad, joystick, or other peripheral. Display 34 can be a touch screen display, in which case mouse 30 is not required.

In some embodiments display 34 is a flat-screen LCD with internal speakers 42. Display 34 can be other types, such as a CRT screen, another type of flat screen, or other visual display, and kiosk 20 can have speakers external to display 34. The following description will be for an embodiment using internal speakers for voice commands and prompts, but, alternatively, kiosk 20 can operate without speakers and display commands and prompts in writing only.

A preferred embodiment applies to safety eyewear for company employees. Accordingly, the following description will be for an embodiment in which a kiosk is placed at a placed of employment or affiliated facility. The kiosk can also be placed in a retail store in which the user purchases his or her own safety eyewear, either for work use or for personal use.

In a preferred embodiment, an employee who wishes to obtain prescription safety eyewear begins by accessing kiosk 20. Kiosk 20 is meant to be located at an employer's workplace, such as a manufacturing plant. Kiosk 20 can be located conveniently for the employees, such as in or adjacent to locker rooms, break rooms, cafeterias, front offices, or at other convenient locations such as an employee credit union or a labor union office.

Figure 2A:
FIG. 2A is a sample first screenshot seen by an employee accessing the kiosk of FIG. 1.
Figure 2B:
FIG. 2B is a log-in screenshot seen by an employee accessing the kiosk of FIG. 1.

The employee initiates kiosk 20 by entering a key on keyboard 28 or by moving mouse 30. Alternatively, an on-off switch can be provided or a proximity switch can be used to start kiosk 20 upon the approach of a person. The first screenshot seen by the employee upon initiating kiosk 20 is shown in FIG. 2A, which is a general welcome screen and preferably has a choice of languages for selection by the employee where appropriate. Selection of a language brings up the screenshot shown in FIG. 2B, which is a conventional log-in screen. The employee then uses keyboard 28 to enter a company-issued identification name or number and a password. Kiosk 20 verifies the employee's identity and authority to access kiosk 20, either by comparison to data stored in CPU 24 or by comparison to data stored in a central server 46 that is accessed by CPU 24 over the Internet or local intranet. Other types of verification can be used including, but not limited to, a magnetic card reader or MD reader for employee identification cards. The employee in these situations can swipe an employee identification card or a benefits card through a magnetic card reader, or holds the employee identification card or benefits card near the RFID reader.

Figure 2C:
FIG. 2C is an account confirmation screenshot seen by an employee accessing the kiosk of FIG. 1.

Upon recognition and authentication of the employee, kiosk 20 displays the screenshot shown in FIG. 2C, which confirms the employee's name, email address, employee identification number, amount of benefits available, and expiration of eligibility for the benefits. The employee confirms or edits this information and then confirms, by clicking a "Next" button with mouse 30.

Figure 2D:
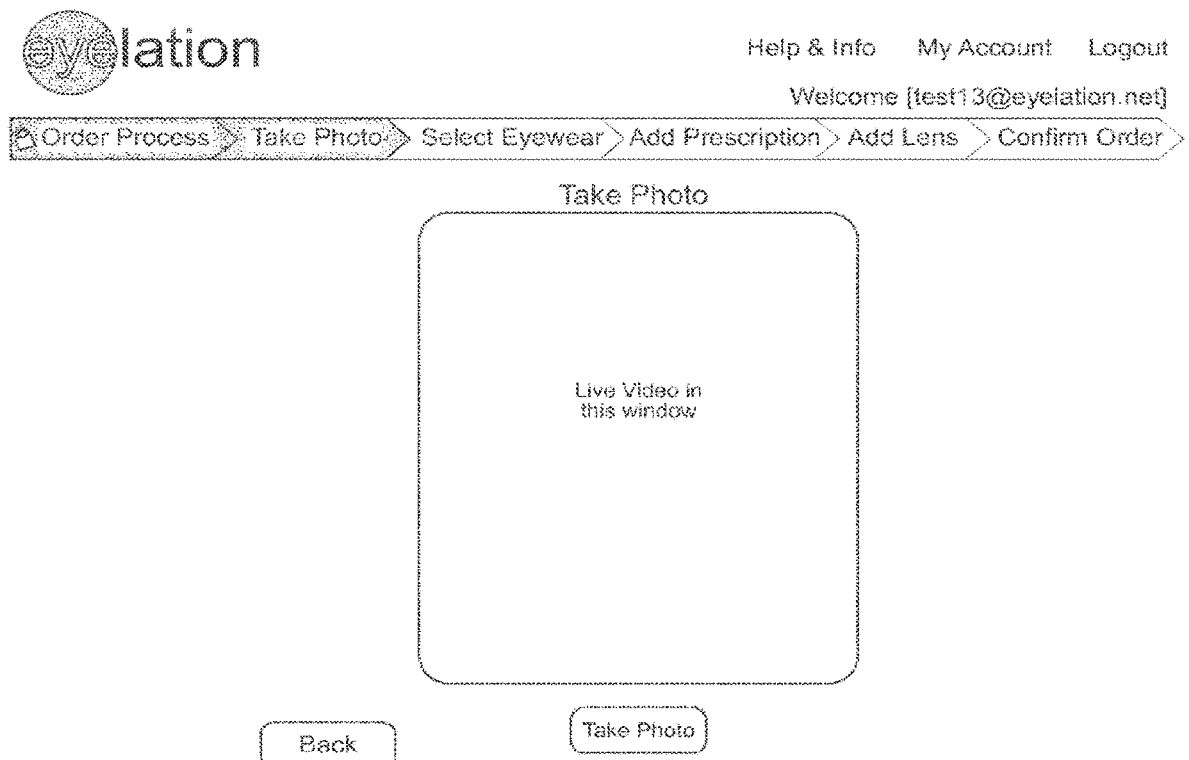
FIG. 2D is a photography screenshot seen by an employee accessing the kiosk of FIG. 1.
Figure 2E:
FIG. 2E is a screenshot showing an employee accessing the kiosk of FIG. 1.

The employee is then presented by the screenshot shown in FIG. 2D. A voice command advises the employee to affix template 40 to his or her forehead, to stand before camera 36 and look directly into the lens of camera 36. The employee's image is then shown on display 34, as shown in FIG. 2E. The employee takes a photograph by clicking the "Take Photo" icon, by entering a key, such as a specifically-named key, on keyboard 28.

CPU 24 receives digital data from camera 36 and creates image 50 of the employee. In some embodiments the image is in jpeg format. Using conventional digital recognition software, CPU 24 can rotate image 50 and automatically provide other digital image processing to correct for improper lighting or other imaging issues.

Figure 2F:
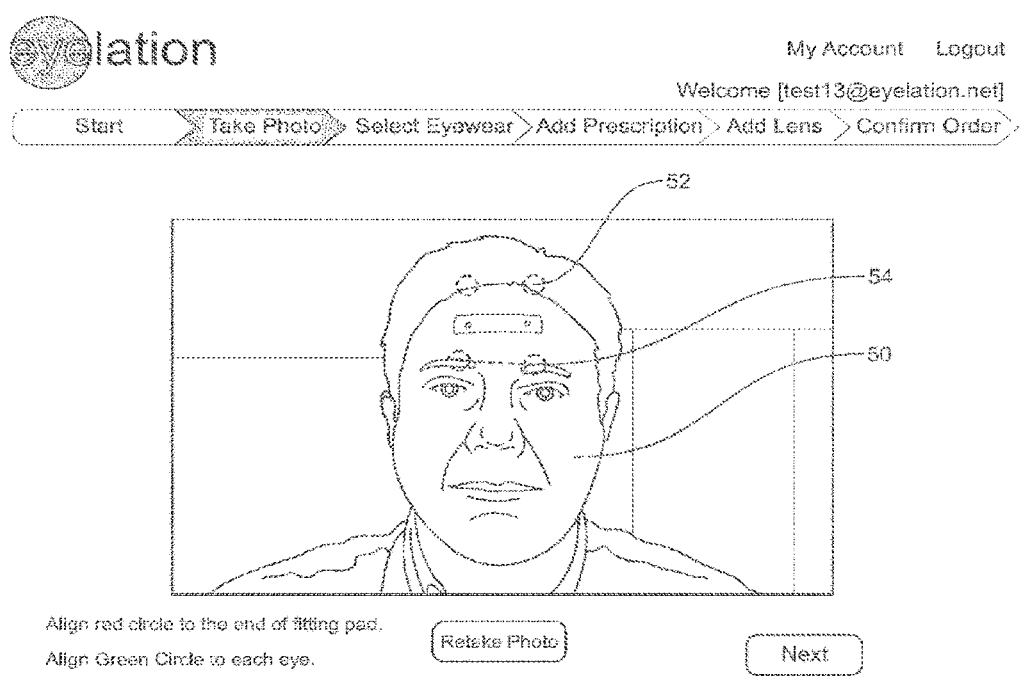
FIG. 2F is a screenshot showing an image of the employee of FIG. 2E with the template alignment tool and pupil alignment tool superimposed thereon.

Kiosk 20 now displays image 50 on display 34 on the screenshot shown in FIG. 2F, with template alignment tool 52 and pupil alignment tool 54 superimposed on image 50. Both template alignment tool 52 and pupil alignment tool 54 are software-implemented tools programmed into CPU 24 to superimpose images on image 50. As shown in FIG. 2F, tools 52 and 54 are not properly aligned.

Figure 2G:
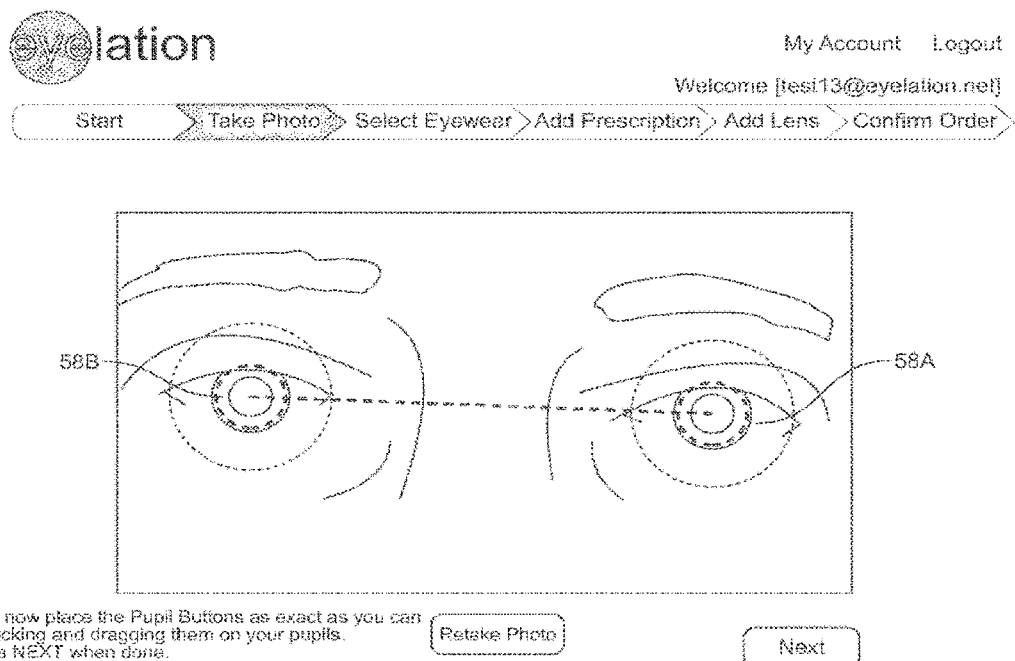
FIG. 2G is a magnified portion of a screenshot showing the image of FIG. 2F with the pupil alignment tool properly adjusted.
Figure 2H:
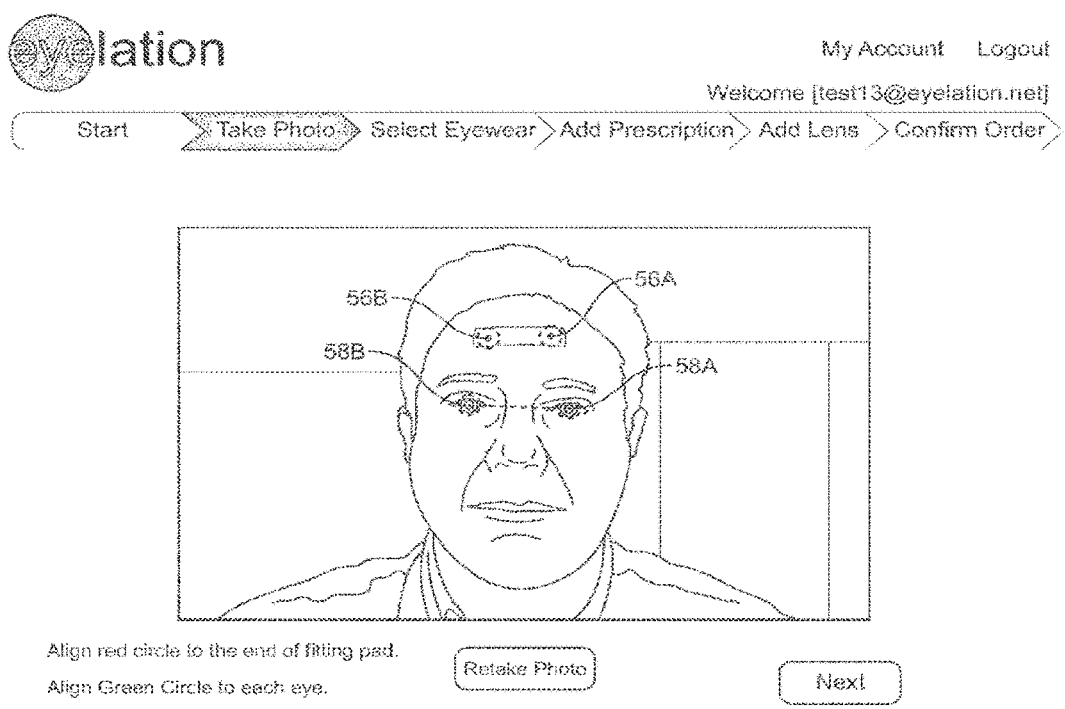
FIG. 2H is a screenshot showing the image of FIG. 2F with the template alignment tool properly adjusted.

Kiosk 20 instructs the employee to use mouse 30 to move pupil alignment tool 54 to place two circles 58a, 58b on the pupils of the employee's image 50, as shown in FIG. 2G. When the employee has done so and confirms by clicking "Next", kiosk 20 instructs the employee to use mouse 30 to move the two circles 56a, 56b of template alignment tool 52 to opposite edges of template 40 as it appears in image 50 on the forehead of the employee. As shown in FIG. 2H, both pupil alignment tool 54 and template alignment tool 52 are properly aligned on the image of the employee's face. The employee clicks the "Next" icon when finished, or opts for a different picture.

In another embodiment, CPU 24 is programmed with autodetect software. CPU 24 detects the employee's eyes and detects template 40 on the image. In this embodiment, the employee then confirms that CPU 24 has properly autodetected the pupils and template 40.

CPU 24, knowing the distance between the opposite edges of template 40, calculates the pupil distance between the employee's eyes, regardless of the distance between the employee's face and camera 36 at the time image 50 was captured.

Figures 2I, 2J:
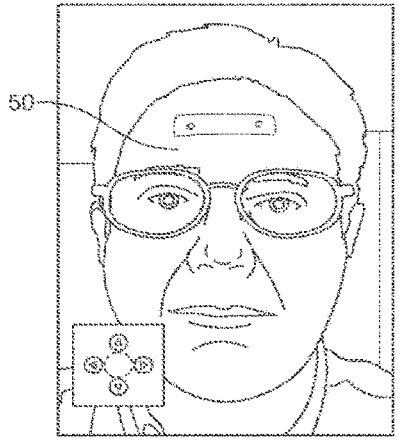
FIG. 2I is a screenshot of the frame selection menu and displayed photograph showing a frame selected by the employee accessing the kiosk of FIG. 1.
FIG. 2J is a optometry prescription display screenshot seen by an employee accessing the kiosk of FIG. 1.

The employee now selects a frame from a menu. As illustrated in FIG. 2I, the employee can navigate through the menu by clicking arrows on either side. Other types of menu navigation procedures can be used. When the employee sees a desired frame, he or she clicks on the frame, whereby the selected frame is superimposed over image 50. The CPU 24 has calculated the employee's pupil distance using template alignment tool 52 and pupil alignment tool 54, and therefore has information relating to the relative size of the employee's face in image 50, from template 40, thus the CPU 24 automatically sizes the selected frame properly to fit on the employee's face in image 50. The employee is prompted to click and drag the selected frame to adjust its location on the image. Accordingly, the employee can see how he or she will look in the selected, properly-fitted frame, as shown in FIG. 2I.

If the employee is satisfied with the selected frame, the process continues. Otherwise, the employee can select a different frame and see how he or she will look in that different selection. The employee can continue until a final selection is made. If available under company benefit's policy, or if the employee chooses at his or he own cost, the employee can select more than one frame for purchase.

The employee can, at this point, choose to print image 50 with a selected frame shown thereon, and to save the data up to this point. The employee can take printed image 50, or even several printed images 50 with different selected frames, for further consideration or to obtain opinions from others, before returning at a later time and picking up the process again at this point.

If the employee is satisfied with the selected frame, kiosk 20 now proceeds to the screenshot shown in FIG. 2J. The employee's last prescription, if available, is called from memory, either from the memory of CPU 24 or from central server 46, and is displayed. The employee is given the option to use the current prescription if it is recent, by clicking the "Next" icon. Kiosk 20 can check the age of the prescription and can be programmed to refuse to accept a prescription older than a predetermined age. Even if the initial prescription is not expired, the employee can be given the option to scan in a new prescription, to fax a new prescription later, or to suggest contact with the employee's optician, optometrist, or ophthalmologist, as described in FIG. 2J.

If the employee has a new prescription or is a new employee, the next screenshot, shown in FIG. 2K, displays instructions on scanning the prescription using scanner 32. The employee then scans the prescription into scanner 32, which relays that information to CPU 24, and the employee's database is updated thereby.

Kiosk 20 confirms that the prescription was properly scanned and downloaded, and gives the employee an option to rescan. Otherwise, when the employee accepts that the prescription has been scanned, kiosk 20 proceeds to the options available to the employee.

Some sample options are shown in the next several screens. The screenshot shown in FIG. 2L shows options for lens type. The screenshot shown in FIG. 2M shows options for lens material. The employee chooses whatever options are desired from those screens and navigates to the next screen by clicking "Next." The following screenshot, shown in FIG. 2N, provides recommendations to the employee as to the options available, and permits the employee to go back to the screenshots shown in FIGS. 2L and 2M to re-select options.

Additional features, such as anti-reflective coating, color, or anti-scratch coatings are presented in the screenshot shown in FIG. 2O. The employee selects whatever additional features are desired and proceeds to the next screenshot, shown in FIG. 2P. Here, the total package is summarized and the final cost is given. The employee is given the option of saving for later, completing the transaction, or starting over.

Figure 2Q:
FIG. 2Q is a confirmation of employer benefits screenshot seen by an employee accessing the kiosk of FIG. 1.
Figure 2R:
FIG. 2R is a final payment screenshot seen by an employee accessing the kiosk of FIG. 1.

If the employee chooses to complete the transaction, the screenshot shown in FIG. 2Q is shown, summarizing the order, applying the benefits, if any, and asking the employee to complete the transaction. If the employee chooses to complete the transaction, the final screenshot, shown in FIG. 2R, is shown, with the final details. If a balance is due, such as if the employee went over the employer's benefit, an option is given to pay by credit card or by payroll deduction (if available). Printer 38 will print a confirmation for the employee for record-keeping purposes, such as tax deduction, if available. Alternatively, kiosk 20 will email the confirmation to the employee, using a stored email address or by prompting for entry of an email address.

After completion of the transaction, kiosk 20 transmits to central server 46 the details of the transaction. These details include the selected frame, selected options for the selected frame, the employee's prescription, the selected lens, selected options for the selected lens, the financial details, such as cost of the frame, lenses, and selected options, less the employer's benefit, and any discounts that can apply.

In some cases, the employee has not submitted a current prescription. The operator, its agent, or its contractor locates the fax sent by the employee, if that option was used, and manually enter the prescription information into central server 46.

In other cases, the employee chose the option of requiring the operator to contact the optician, optometrist, or ophthalmologist. In these situations, the operator, its agent, or its contractor contacts the optician, optometrist, or ophthalmologist for the prescription information and manually enters it, or obtain a fax from the optician, optometrist, or ophthalmologist and manually enters the prescription information from that document.

The operator of kiosk 20 then prepares the employee's selected prescription safety eyewear, either in-house or using one or more contractors. The operator or a designated contractor either has the selected frame, in the correct size and with the selected options, or purchases the selected frame with the selected options from a manufacturer or broker, The operator then either obtains or makes the lenses in-house, to meet the employee's prescription and selected options. The operator then assembles the lenses to the frame, again either in-house or using a suitable outside contractor. Finally assembled prescription safety eyewear is shipped.

In the illustrated embodiment, as shown in FIG. 2R, the final eyewear is shipped to the employer's place of business, such as the Safety Department. The Safety Department has the option, if the employer desires, of verifying that the selected frame and lenses are appropriate and meet government and industry standards, and then distributes the eyewear to the employee. The employer could also accepts that frames and lenses supplied by a given operator are appropriate. Additionally, the eyewear can shipped directly to the employee. In that case, an additional screenshot is used in kiosk 20 to select shipping options, such as overnight, air freight, or standard. In some embodiments the additional charges associated with these shipping options are shown.

One benefit of the above embodiments is that the kiosk is readily available and is located at the workplace or at some other convenient location. The employee therefore does not have to shop for eyewear on his or her own time and does not have to come to work at an inconvenient or unscheduled time. The employee is also assured that whatever eyewear he or she selects will meet company requirements, as the employer will require the operator to limit frame selection, lens selection, and options to those meeting company, industry and/or governmental standards. The employee will also have benefits automatically applied, without having to go through an arduous and possibly slow reimbursement procedure. The employee can also easily check what benefits are available and if a new benefit term has been reached.

The employer using the system of the described embodiments can be assured that employees will only purchase eyewear meeting company, industry, and/or governmental standards. The employer therefore can forego checking individual employees' eyewear purchases to be sure the eyewear is compliant. The employer can be assured that personnel who are required to wear safety eyewear and who need prescription safety eyewear are obtaining properly-fitted, safety-standard-compliant equipment and are able to do so in a convenient manner. The employer also knows when particular employees have ordered new eyewear and can take steps to make sure employees are keeping their safety equipment current and in good repair.

The employer also has benefits automatically applied to its employees' purchase of safety prescription eyewear, saving the trouble of processing numerous hand-written reimbursement requests and allowing for easier, more transparent accounting of costs in this area.

The system as described can also be used for non-prescription eyewear. The software is merely modified to provide that the employee can skip the step of submitting a prescription.

A preferred embodiment of the above method comprises the following steps, not all of which are necessary and which need not be performed in the following order except where required by logic.

Step 101: The employee obtains a prescription for eyeglasses from an ophthalmologist, optometrist, or other health-care provider.

Step 102: The employee accesses a kiosk at or near the workplace or other convenient location by logging on, preferably with a user identification and password.

Step 103: The kiosk displays the authorization code, expiration date, and amount of benefits available on the display screen.

Step 104: The employee places a template on his or her forehead.

Step 105: The employee aligns his face with the camera of the computer screen and checks for proper alignment.

Step 106: The kiosk verifies proper alignment and advises the employee to adjust, if necessary.

Step 107: The employee causes the kiosk to photograph the employee's face by clicking a button.

Step 108: The kiosk corrects rotation of the employee's face in photograph, if necessary, and displays the corrected photograph on the display with the template measuring tool and the pupil measuring tool.

Step 109: The employee adjusts the template measuring tool to match the template displayed in the photograph.

Step 110: The employee adjusts the pupil measuring tool to match the pupils displayed in the photograph.

Step 111: The employee accepts the adjustment of the photograph or re-adjusts the template measuring tool or the pupil measuring tool, or chooses to take a new photograph.

Step 112: The employee selects frames from a menu and clicks on a selected frame.

Step 113: The kiosk displays the details of the selected frame, such as brand, material, color, shape, and price.

Step 114: The kiosk displays options available for the selected frame, such as color.

Step 115: The kiosk displays the selected frame on the photograph.

Step 116: The employee accepts the selected frame, or changes the options, if any, or selects a different frame from the menu.

Step 117: The employee can save a selected frame at this point and return later.

Step 118: When the employee has accepted a selected frame, the kiosk prompts the employee to enter the prescription information, preferably by scanner.

Step 119: The employee enters the prescription information, preferably by inserting a current and valid prescription from his or her doctor into the scanner.

Step 120: The kiosk displays the scanned prescription form and prompts the employee to accept the scan or to rescan.

Step 121: The kiosk displays a menu of lens options, if available.

Step 122: The employee selects lens options, if available.

Step 123: The kiosk displays prices based on the employee's selection of options.

Step 124: The kiosk displays recommendations for unselected options, if appropriate.

Step 125: The employee confirms the original selection or selects other options.

Step 126: Upon confirmation, the kiosk displays the final product and total cost.

Step 127: The employee selects shipping options, if available (for examples, overnight or standard freight), and location to be shipped (for examples, home or place of employment).

Step 128: The kiosk calculates the employer benefit, if available, applies that benefit to the total cost, applies a discount, if applicable, applies a shipping charge, if applicable, computes taxes due, if any, and displays a net cost.

Step 129: The employee confirms the order.

Step 130: If money is due in excess of the employer's benefit, the kiosk prompts the employee for payment, such as by payroll deduction or credit card.

Step 131: The kiosk provider purchases the selected frame or picks the selected frame from previously-purchased stock, causes the lenses to be manufactured and applied to the selected frame, and causes the assembled eyewear to be shipped to the location previously selected.

Figure 3:
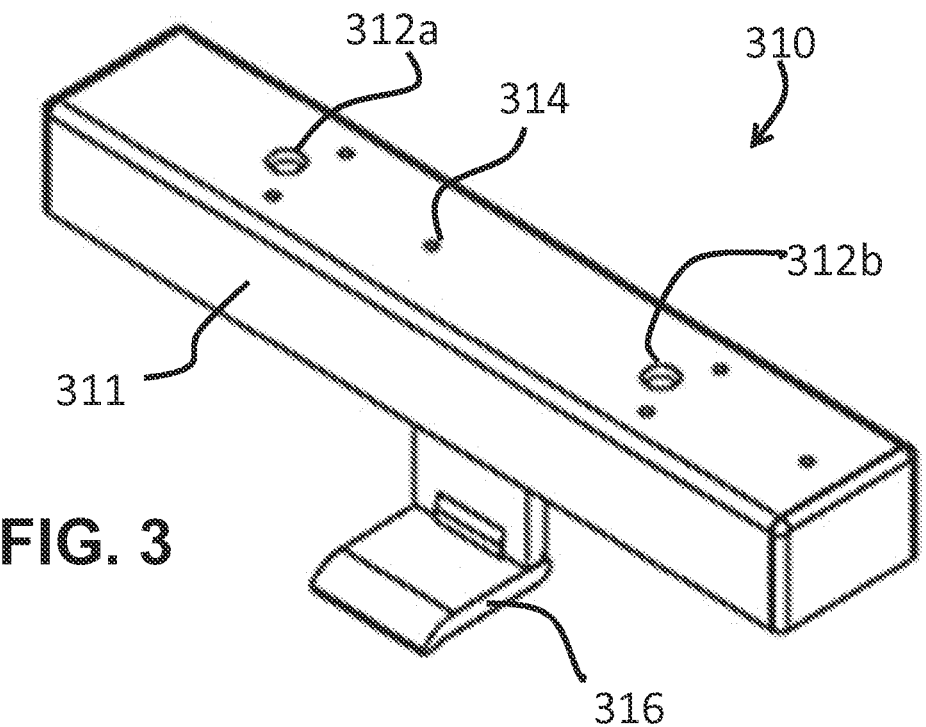
FIG. 3 is an isometric view of a horizontal dual-camera apparatus for deriving dimensional measurements.

Turning to FIG. 3, dual-camera apparatus 310 includes housing 311 in which digital cameras with lenses 312a and 312b are encased. Digital cameras lenses 312a and 312b are spaced apart at a fixed, known distance. An articulated clip 316 extends from housing 311 and is configured to be mounted and retained on the top edge of a computer screen or other thin, upright structure (not shown).

Fasteners, one of which is denoted in FIG. 3 as threaded fastener 314, when removed provide access to the interior of housing 311, which contains the wires and other customary electronic components to transmit electrical signals from apparatus 310 to an operatively connected computer (not shown).

Figure 4:
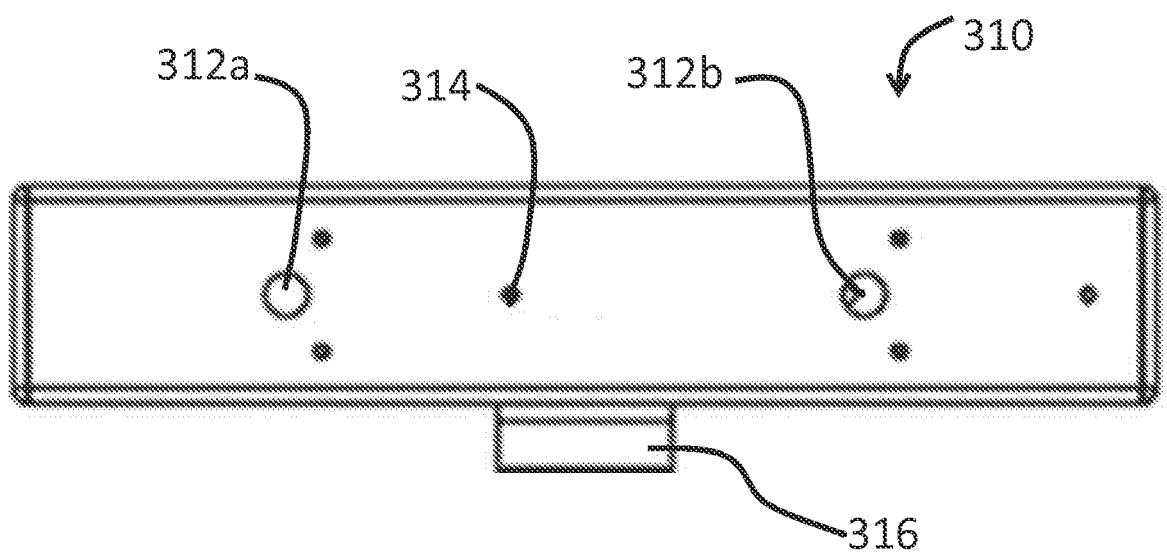
FIG. 4 is a front view of the apparatus illustrated in FIG. 3, and which shows the two cameras, spaced apart at a known distance, employed in the apparatus.
Figure 5:
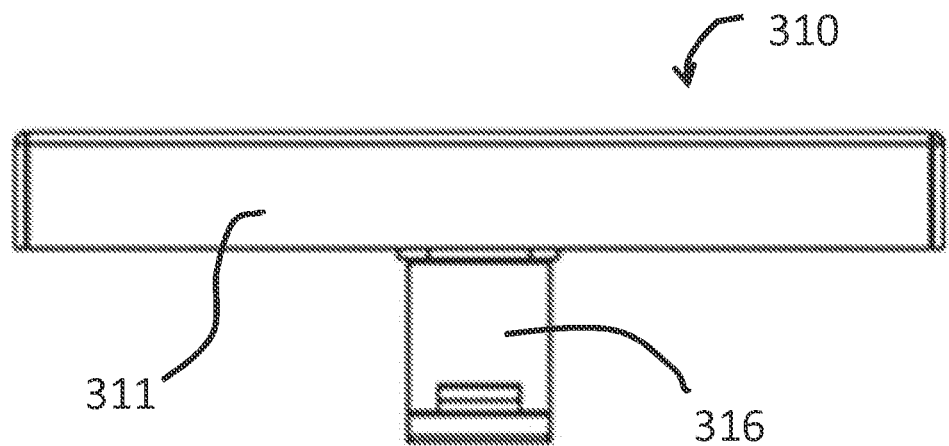
FIG. 5 is a back view of the apparatus illustrated in FIGS. 3 and 4, and shows in particular the clip for mounting the apparatus on a computer screen or other upright surface.

FIG. 4 shows a front view of dual-camera apparatus 310, including digital camera lenses 312a, 312b encased in housing 311, as well as mounting clip 316 and fastener 314. Similarly, FIG. 5 is a back view of apparatus 310 showing housing 311 and mounting clip 316.

Figure 6:
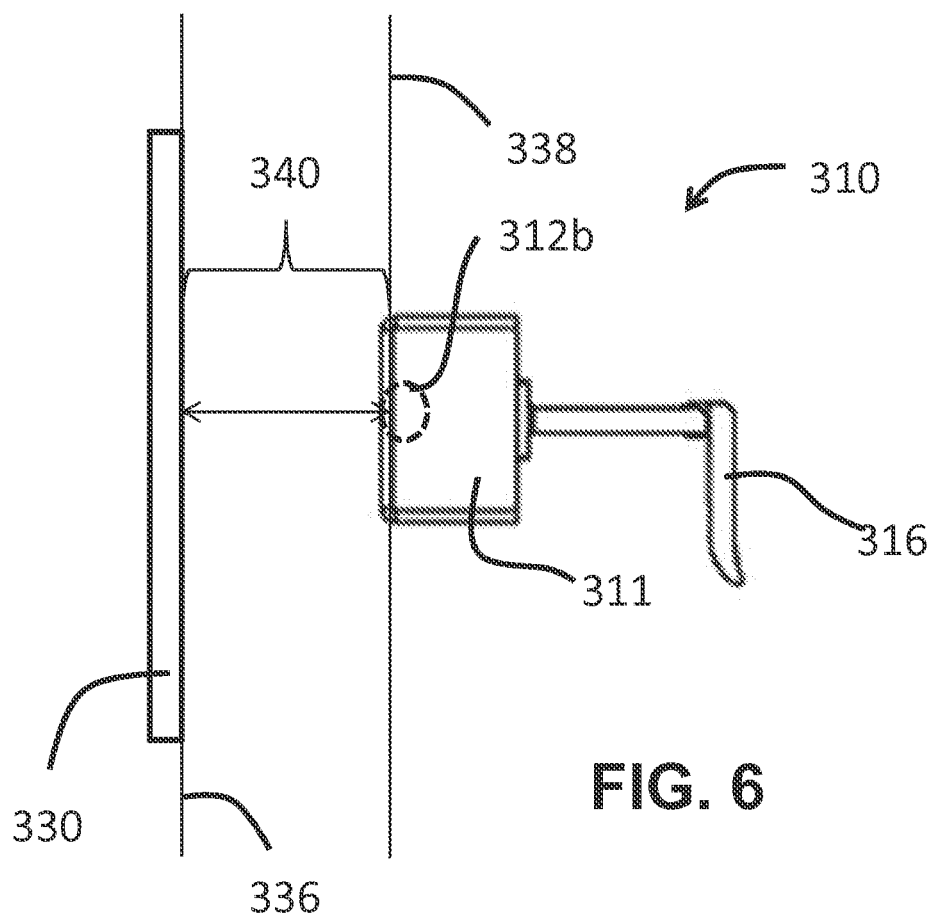
FIG. 6 is a side view of the apparatus illustrated in FIGS. 3-5, and shows, in particular, the calibration setup for determining the distance from a reference plane to the plane of the housing front face containing the dual camera lenses.
Figure 7:
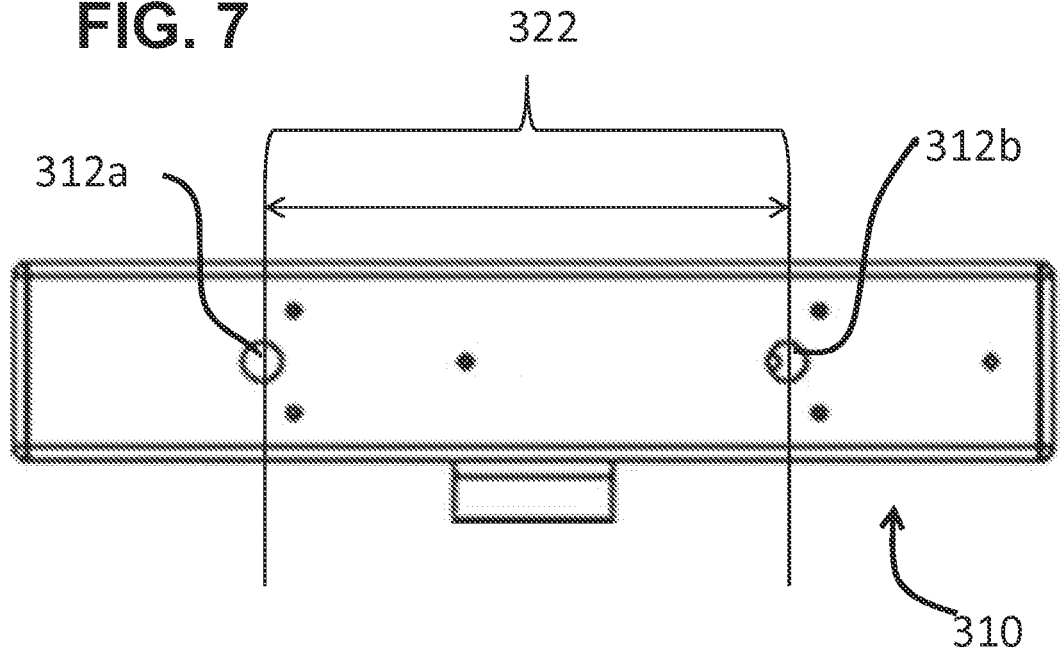
FIG. 7 is an enlarged front view of a horizontal dual-camera apparatus in which the fixed, known distance between the cameras is indicated, as well as the alignment of the horizontal and vertical axes associated with the cameras.
Figure 8:
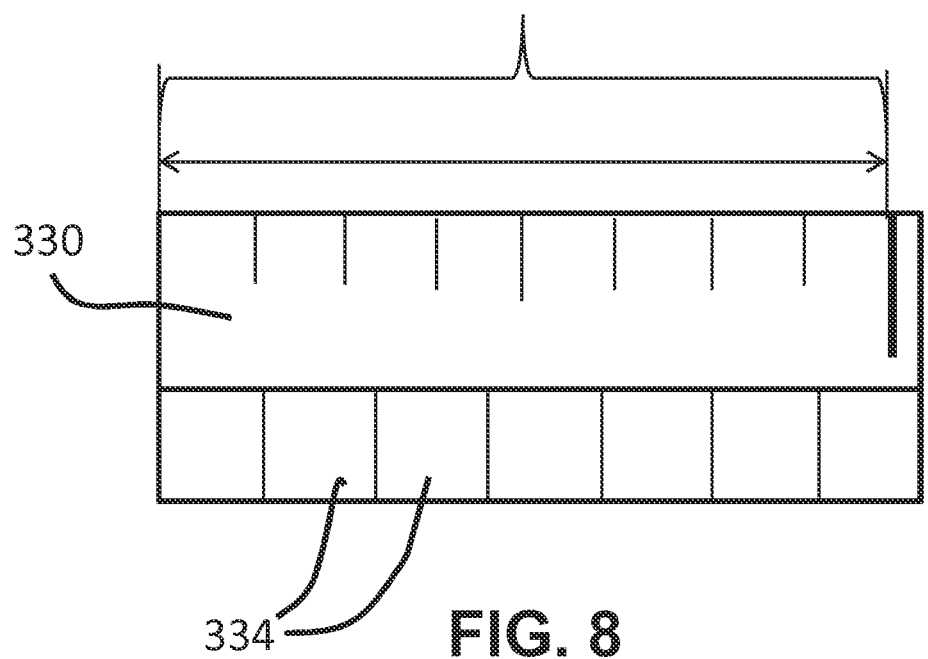
FIG. 8 is schematic diagram illustrating a template or ruler for converting a distance measurement to a number of pixels in a digital camera device.
Figure 9:
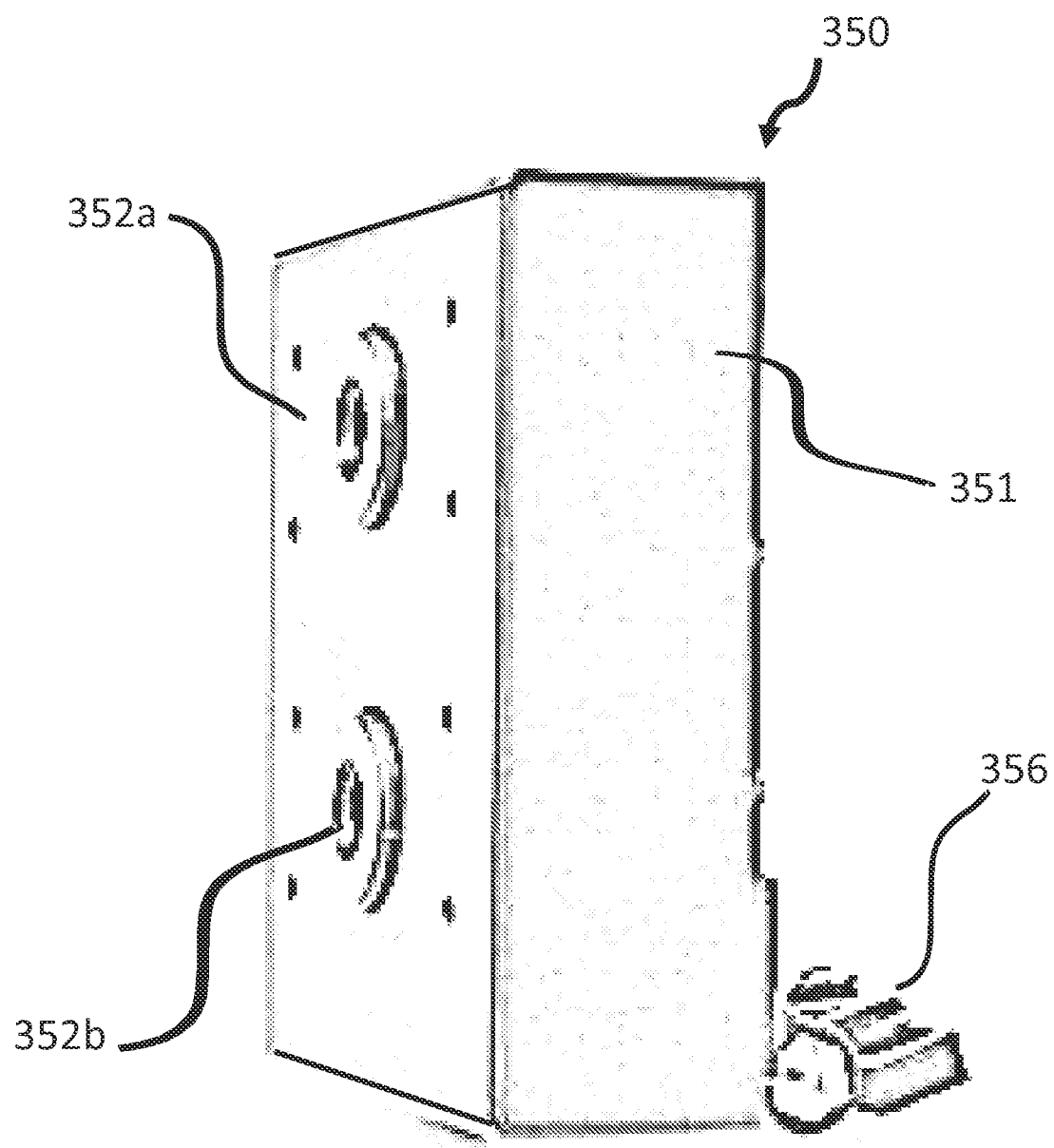
FIG. 9 is a perspective view of the side of a vertical dual-camera apparatus for deriving dimensional measurements.

As shown in FIGS. 6 and 7, dual-camera apparatus 310 allows for a single calibration to be performed during the manufacturing or installation process. Once calibrated, apparatus 310 can remain in a calibrated state for long durations. Turning to FIG. 8, the calibration process includes the correlation of pixels to standard (for example, metric and/or English) dimensional units, as shown in the calibration ruler or template 330, in which a known length 332 is correlated to a number of pixels 334.

Using the distances established for dual-camera apparatus 310 (namely, known distance 322 in FIG. 7 and distance 340 in FIG. 6 derived from images taken by the digital cameras of the calibration template), horizontal and vertical axes can be established. Distance 322, as shown in FIG. 7, is the known distance between the centerlines of camera lenses 312a, 312b. In one embodiment distance 322 is about 120 mm. In other embodiments distance 322 is reduced to about 40 mm. Reducing distance 322 reduces the stereo correspondence problem which can occur when the two images taken from the two lenses 312a and 312b are combined. This reduced stereo correspondence problem leads to improved measurements and in at least some embodiments reduces the chance that one or more of user's eyes are not captured when a user does not correctly center himself between the two lenses 312a and 312b.

As shown in FIG. 6, distance 340 can be calculated as the distance between apparatus reference plane 338 and parallel calibration template reference plane 336. Apparatus reference plane 338 is established by the front face of housing 311, which is assumed to be co-extensive with the front surface of the camera lenses, one of which is shown in phantom lines in FIG. 6 as camera lens 312b. Template reference plane 336 is established by face of calibration template 330.

The apparatus can thus compensate for zooming in/out relative to an object, as well as rotational deviations from the calculated horizontal and vertical axes, by reference to the distance values established in the initial calibration process.

In the case of fitting an employee with personal protective equipment, a subject's body features associated with the apparel as worn are measured and derived from the digital camera images. The images of the subject can be accurately reconfigured (that is, rotated and/or zoomed in/out) to match the scale of a fixed digital display of the apparel being fitted.

Similar to horizontal dual-camera apparatus 310 of FIGS. 3-8, FIG. 9 shows vertical dual-camera apparatus 350 which includes housing 351 in which digital cameras with lenses 352a and 352b are encased. Digital cameras lenses 352a, 352b are spaced apart at a fixed, known distance. In some embodiments the digital cameras can have auto-focus capabilities.

Hinge 356 extends from housing 351 and is configured to be mounted and retained on the top edge of a computer screen or other, upright structure such as a kiosk (not shown). In some embodiments hinge 356 acts as a stand. In at least one embodiment, hinge 356 has a range of about 110 degrees. In some embodiments the tension in hinge 356 is adjustable.

Figure 10:
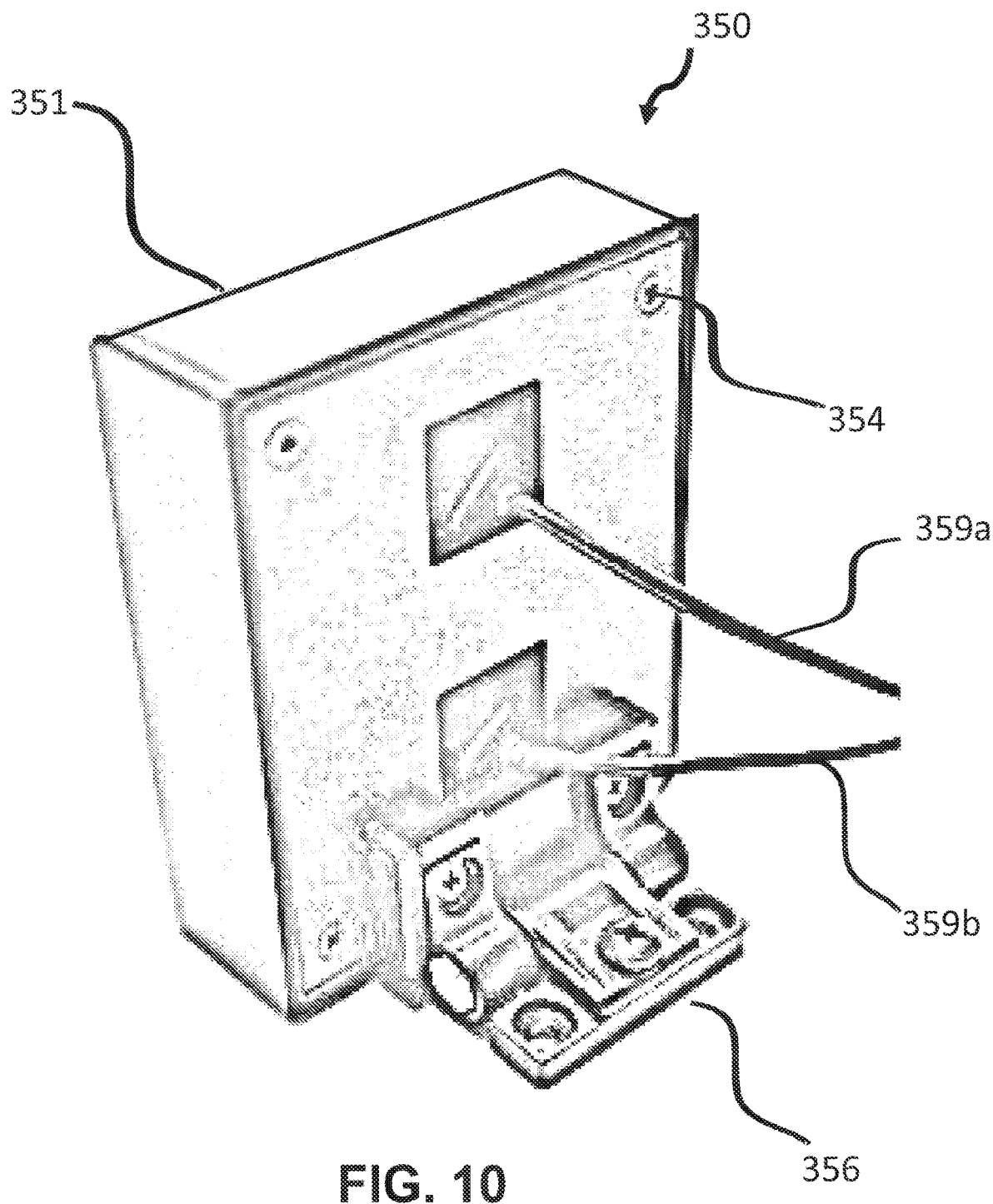
FIG. 10 is a perspective view of the back of the vertical dual-camera apparatus illustrated in FIG. 9.

Fasteners, one of which is denoted in FIG. 10 as threaded fastener 354, when removed provide access to the interior of housing 351, which contains the wires and other customary electronic components to transmit electrical signals from apparatus 350 to an operatively connected computer (not shown).

FIG. 10 shows a back perspective view of vertical dual-camera apparatus 350, including hinge 356 and fastener 354. FIG. 10 also shows optional cables 359a and 359b which can connect apparatus 350 to a computer and/or network. In other embodiments apparatus 350 connects to a computer and/or network wirelessly.

Figure 11:
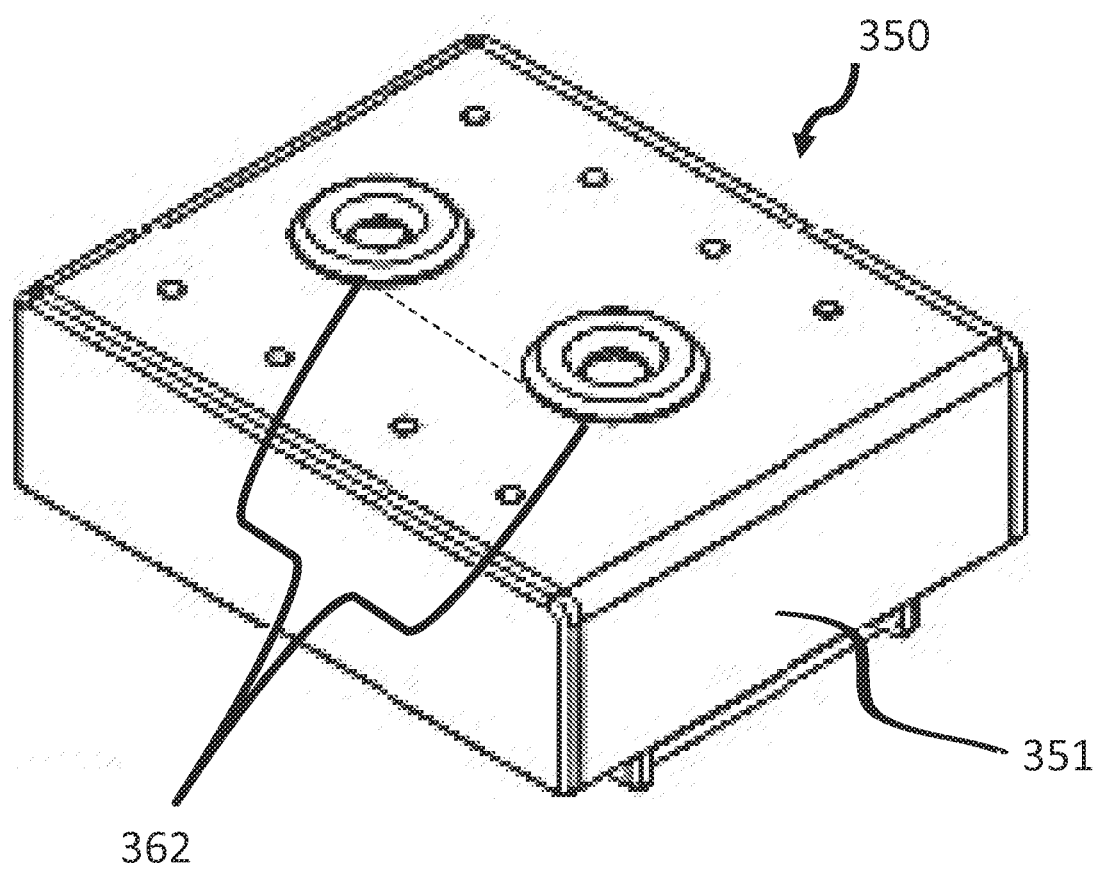
FIG. 11 is a perspective view of the front of the vertical dual-camera apparatus illustrated in FIGS. 9 and 10.

FIG. 11 is a front perspective view of apparatus 350 showing housing 351 and lenses 352a and 352b along with the distance 362 between lenses 352a and 52b.

Similar to apparatus 310 in FIGS. 6 and 7, vertical dual-camera apparatus 350 allows for a single calibration to be performed during the manufacturing or installation process. Once calibrated, apparatus 350 can remain in a calibrated state for long durations. The calibration process includes the correlation of pixels to standard (for example, metric and/or English) dimensional units.

Using the distances established for dual-camera apparatus 350 (namely, known distance 362 in FIG. 11 and distance 390 in FIG. 12 derived from images taken by the digital cameras of the calibration template), horizontal and vertical axes can be established. Distance 362, as shown in FIG. 11, is the known distance between the centerlines of camera lenses 352a, 352b. In one embodiment distance 362 is about 40 mm.

Figure 12:
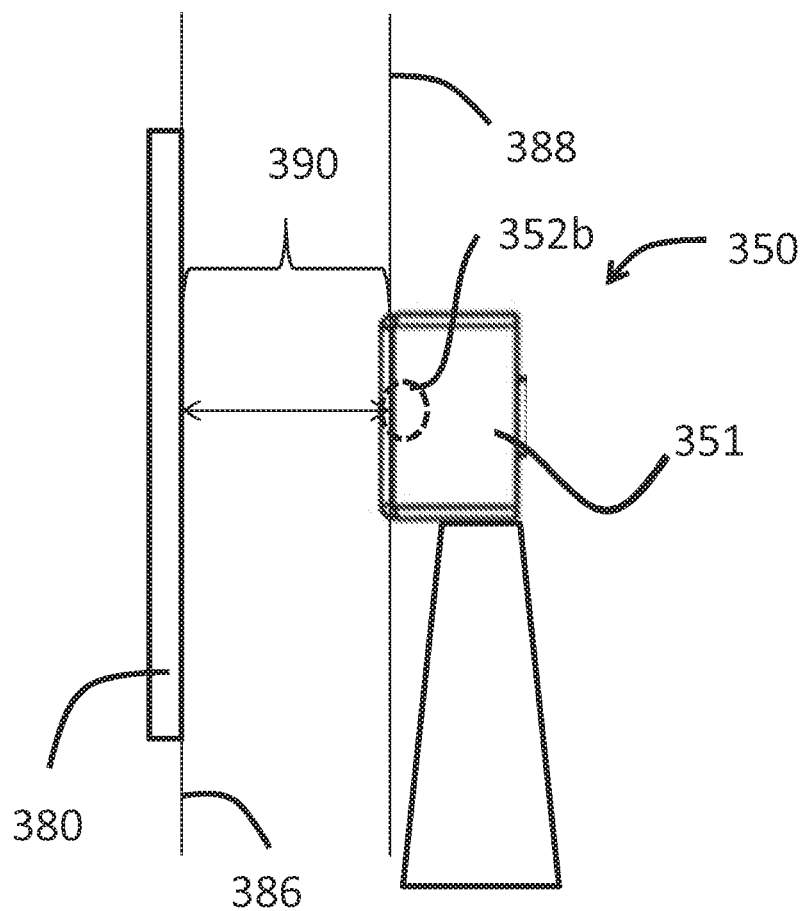
FIG. 12 is a side view of the apparatus illustrated in FIGS. 9-11, and shows, in particular, the calibration setup for determining the distance from a reference plane to the plane of the housing front face containing the dual camera lenses.

As shown in FIG. 12, distance 380 can be calculated as the distance between apparatus reference plane 388 and parallel calibration template reference plane 386. Apparatus reference plane 388 is established by the front face of housing 351, which is assumed to be co-extensive with the front surface of the camera lenses, one of which is shown in phantom lines in FIG. 6 as camera lens 352b. Template reference plane 386 is established by face of calibration template 380.

The apparatus can thus compensate for zooming in/out relative to an object, as well as rotational deviations from the calculated horizontal and vertical axes, by reference to the distance values established in the initial calibration process.

In the case of fitting an employee with personal protective equipment, a subject's body features associated with the apparel as worn are measured and derived from the digital camera images. The images of the subject can be accurately reconfigured (that is, rotated and/or zoomed in/out) to match the scale of a fixed digital display of the apparel being fitted.

Figure 13:
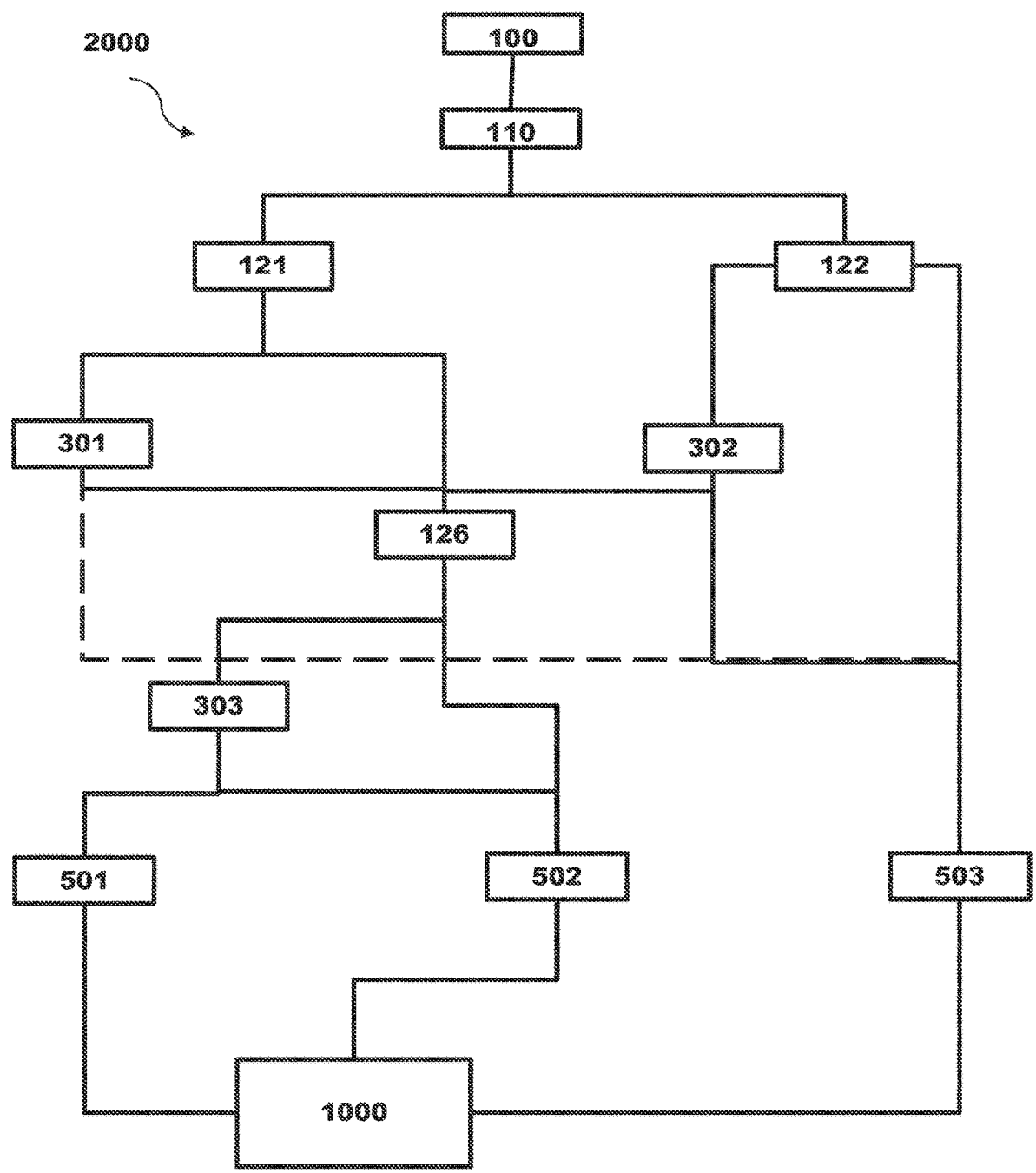
FIG. 13 is schematic diagram of a method of personalizing lens selection.
Figure 14:
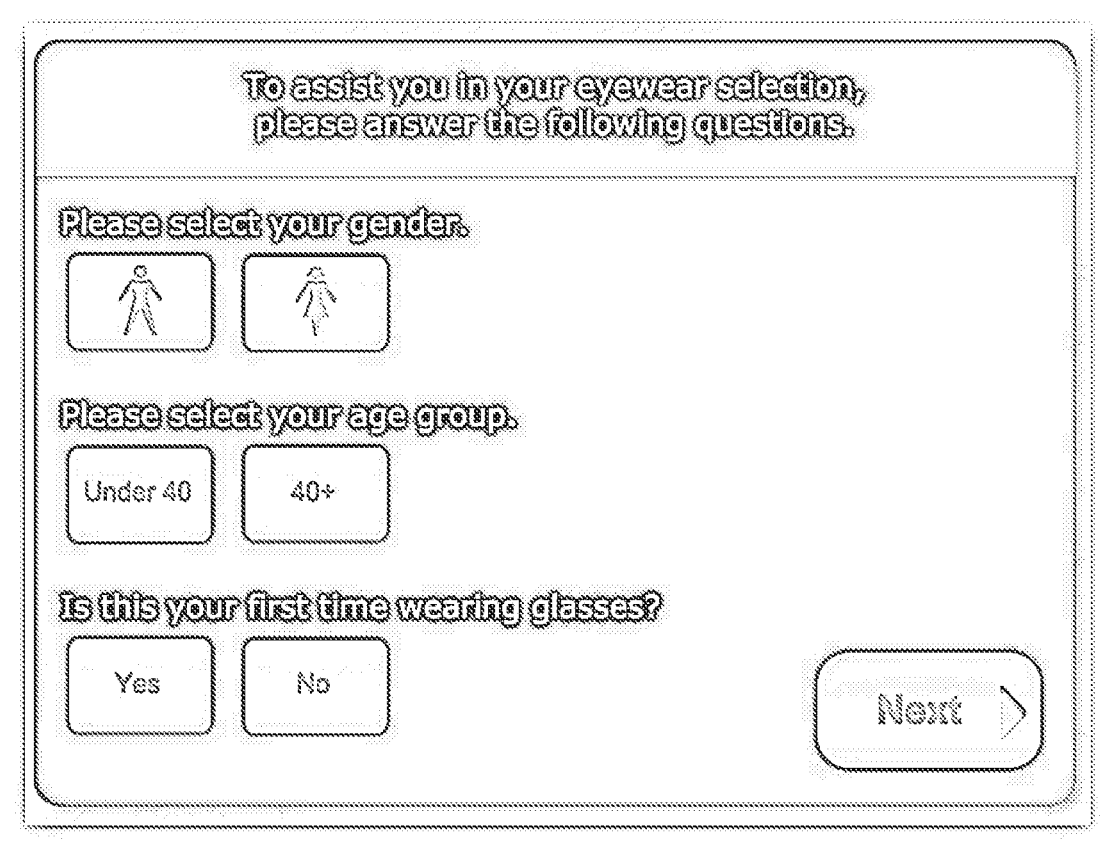

FIG. 13 illustrates a schematic diagram of method 2000 of personalizing lens selection. Starting at step 100 a user, such as, but not limited to, an employee or patient, logs into the lens selection tool. The user is then directed to step 110 in which a survey page, such as the one illustrated in FIG. 14 is shown. In step 110 the user is given the option to indicate, among other factors, his age. The user can indicate his age, among other methods, by entering a birthdate, entering his age in years, or choosing the appropriate age range from a collection of selectable ranges. Additional factors the survey page can collect include, among other things, the user's sex, job responsibilities, and whether this is the first time the user is wearing glasses. The factors can be used to recommend additional features, such as frame types, lens coatings, and/or whether or not to tint a lens.

If the user indicates that he is over a given age, he is taken to step 121. If he indicates he is under the given age he is taken to step 122. In one embodiment this given age is 40 years old.

Figure 16:
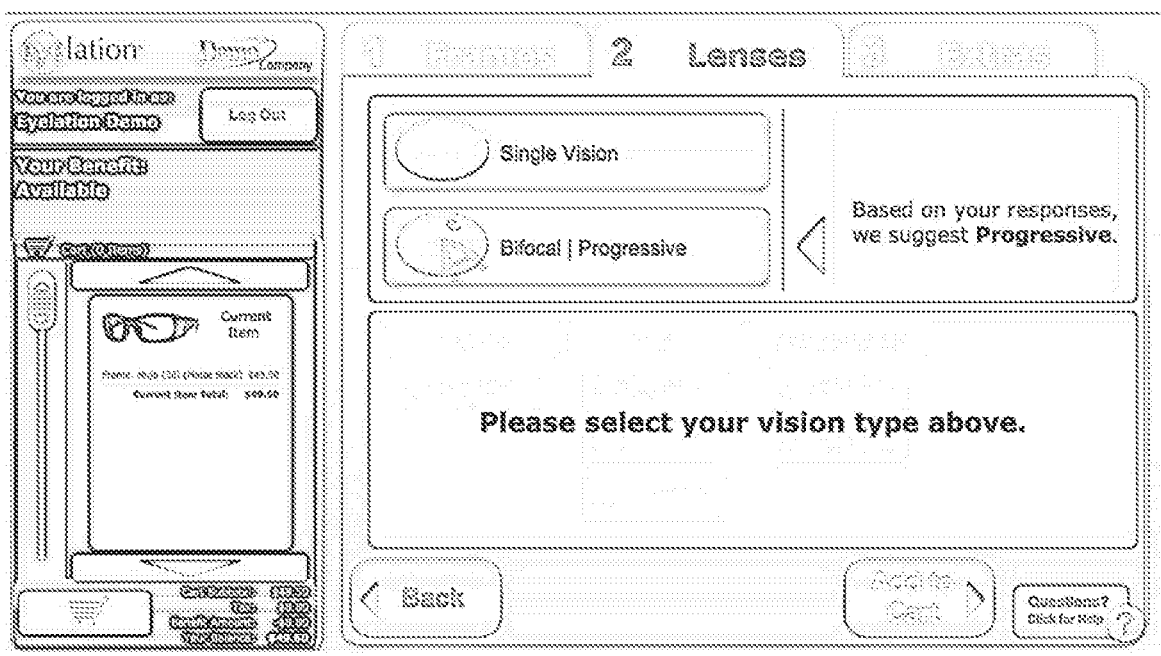
FIG. 16 is a screenshot of a page shown to individuals who indicate that they are over a given age in the survey of FIG. 14.

At step 121, the user is presented with the option to select between single vision lenses and bifocal/progressive lenses with bifocal/progressive lenses being recommended as the preferred lens to choose. FIG. 16 shows an example page that can be displayed in step 121. If the user selects single vision lenses he is taken to step 301. If the user selects bifocal/progressive lenses he proceeds to step 126.

Figure 18:
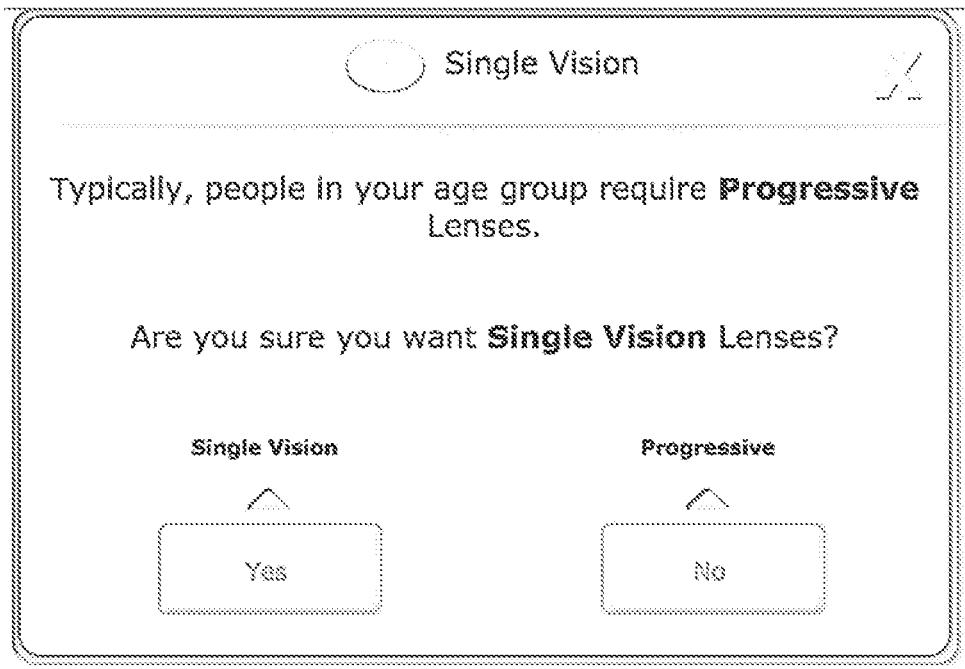
FIG. 18 is a screenshot of a page shown to individuals who chose the non-recommended option in the page shown in FIG. 16.

At step 301 the user is reminded that bifocal/progressive lenses are recommended. FIG. 18 shows an example page that can be displayed in step 301. If the user again selects single vision lenses he is taken to step 503. If however he changes his selection to bifocal/progressive lenses he is taken to step 126.

Figure 19:
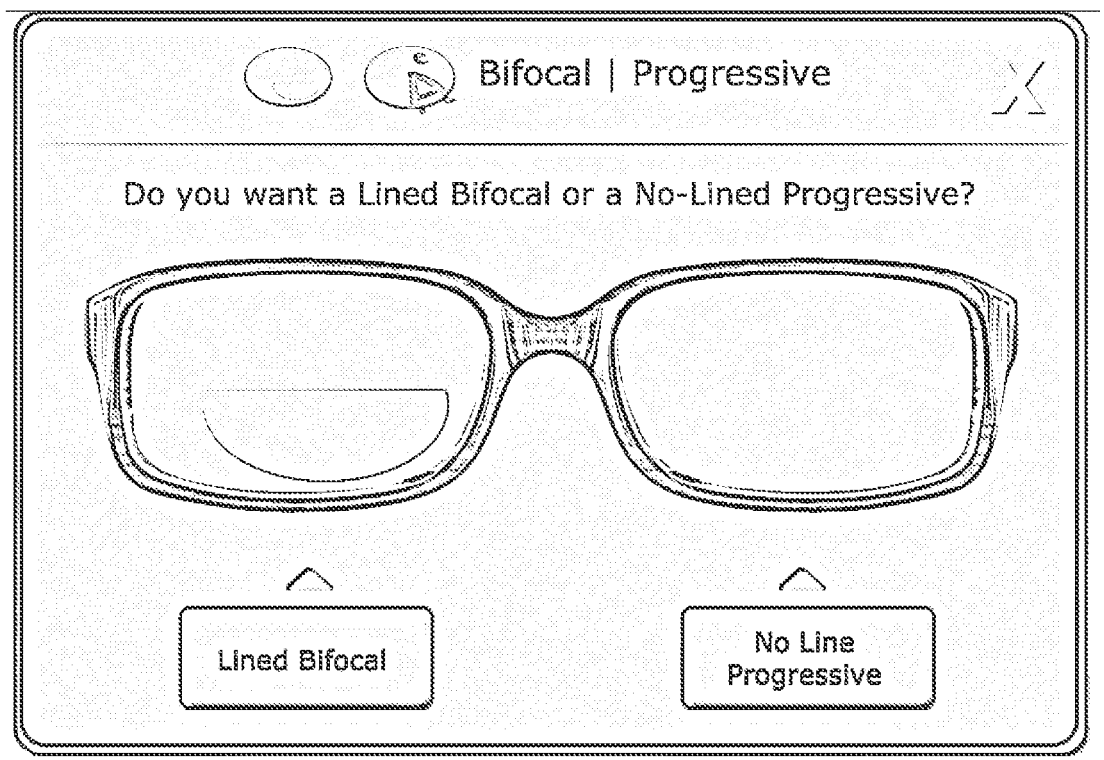
FIG. 19 is a screenshot of a page of a lens selection program which illustrates the difference between lined bifocals and no-lined progressive lenses.

At step 126 the user is asked to choose between bifocal lenses and no-line progressive lenses. In step 126 a user can be presented with a graphic and/or video such as that illustrated in FIG. 19 which shows the difference between bifocal lenses and no-line progressive lenses. If the user selects bifocal lenses he is taken to step 303. If the user selects no-line progressive lenses he is taken to step 502.

Figure 20:
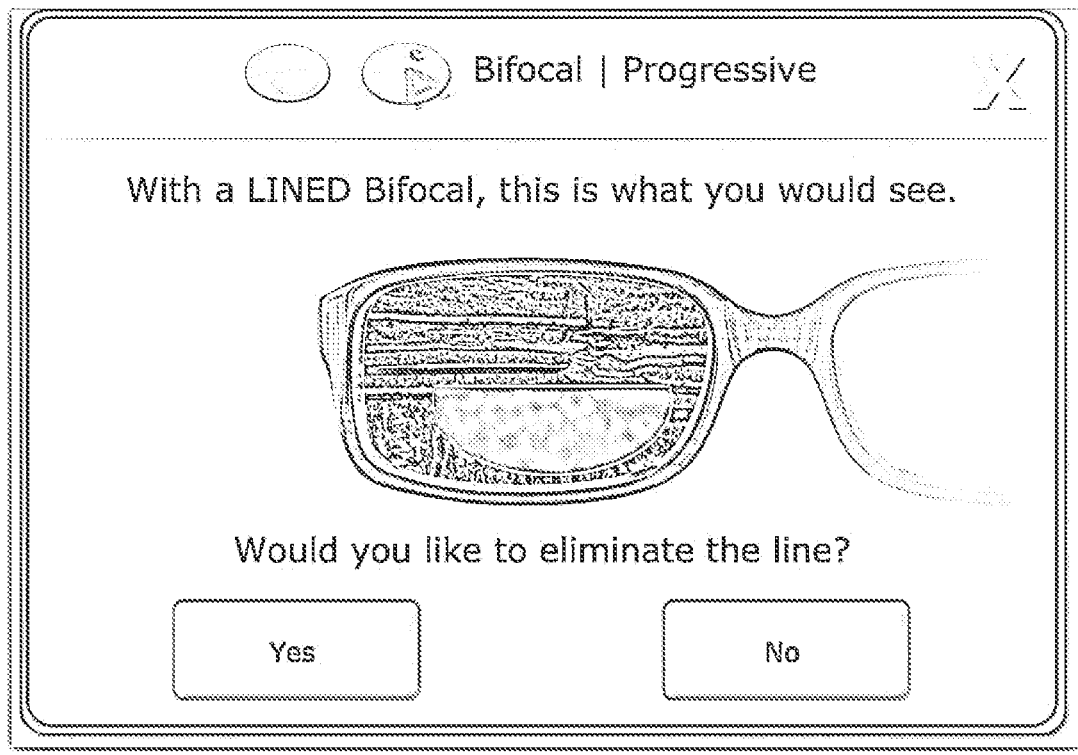
FIG. 20 is a screenshot of another page of a lens selection program which illustrates the difference between lined bifocals and no-lined progressive lenses.

In step 303 the user is asked again if he wishes to select bifocal lenses. Again he can be presented with a graphic and/or video which indicates the difference between bifocal and no-line progressive lenses. The graphic can be that shown in FIG. 19 or a new graphic, such as that illustrated in FIG. 20. In some embodiments FIG. 20 more clearly emphasizes the difference between bifocal and no-line progressive lenses. If the user again selects bifocal lenses he is taken to step 501. If the user changes his selection to no-line progressive lenses he is taken to step 502.

Figure 21:
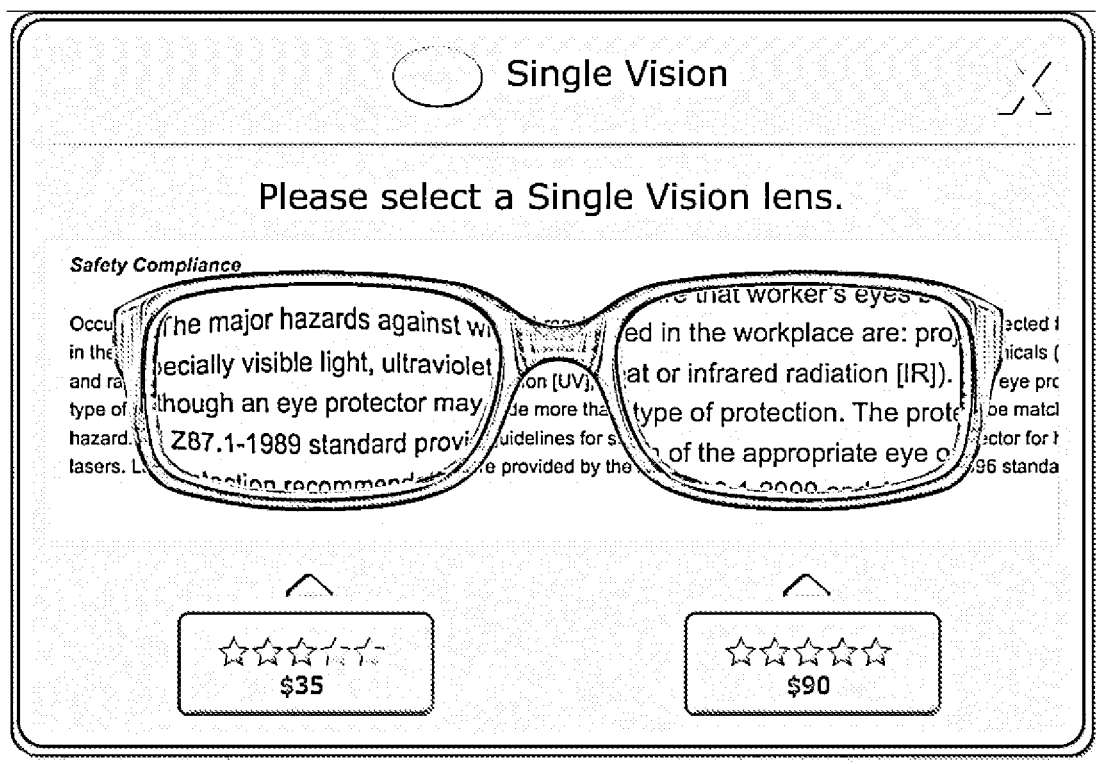
FIG. 21 is a screenshot of a page of a lens selection program which illustrates the difference a user will experience between two different lenses.
Figure 22:
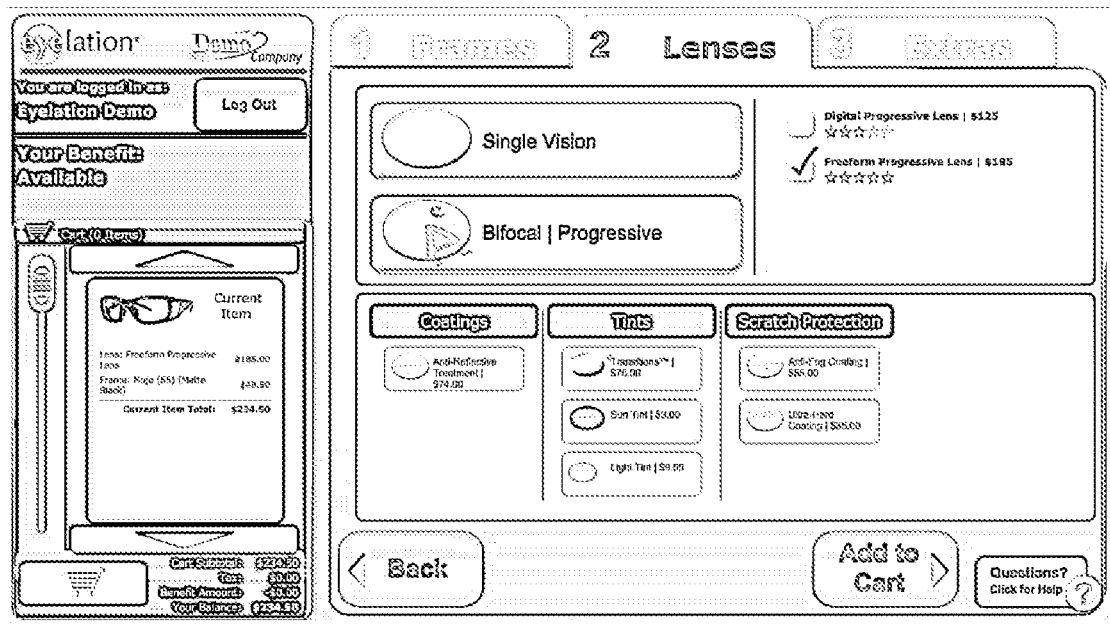
FIG. 22 is an option selection page of a lens selection program.

In step 501 the user is allowed to select between various bifocal lenses. In some embodiments the user is presented with different graphics, such as that illustrated in FIG. 21 indicating the various effects on his vision the given lenses will have. After the lens selection is made the user is taken to step 1000.

In step 502 the user is allowed to select between various progressive no-line lenses. In some embodiments the user is presented with different graphics, such as that illustrated in FIG. 21 indicating the various effects on his vision the given lenses will have. After the lens selection is made the user is taken to step 1000.

In step 503 the user is allowed to select between various single vision lenses. In some embodiments the user is presented with different graphics, such as that illustrated in FIG. 21 indicating the various effects on his vision the given lenses will have. After the lens selection is made the user is taken to step 1000.

In step 1000, the user is given the option to select various lens options such as, but not limited to, lens tinting (including Transitions™), anti-reflective treatments, scratch protection coatings, Polarized lenses, and anti-fog coatings. In some embodiments the user can select to add various types of warranties. Once these selections are made, the glasses can be added to the user's cart and he can proceed to check out.

Figure 15:
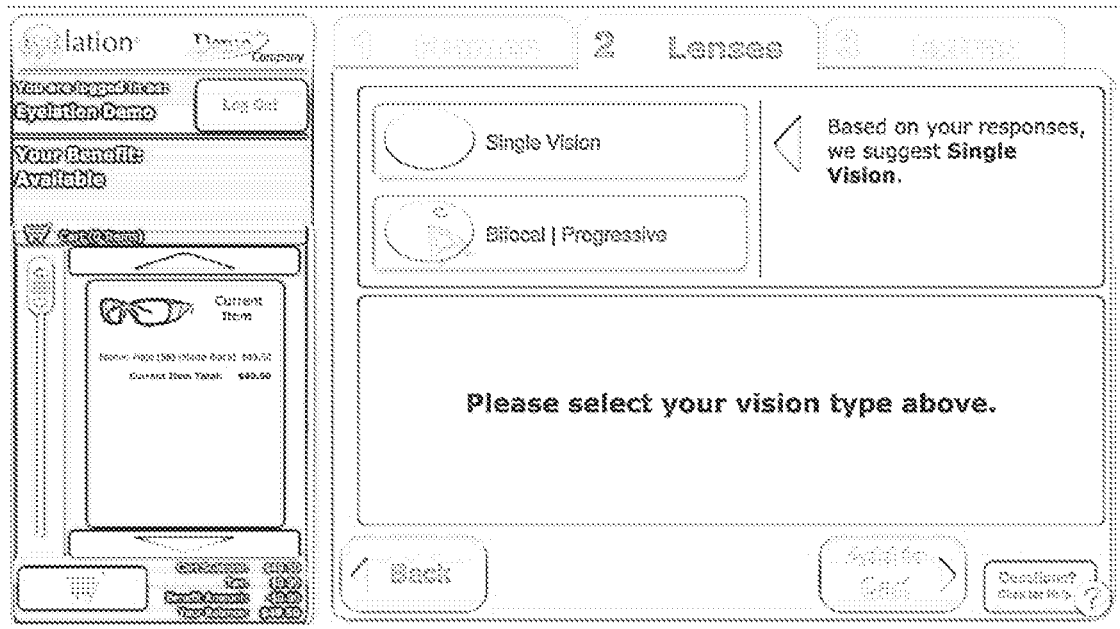
FIG. 15 is a screenshot of a page shown to individuals who indicate that they are under a given age in the survey of FIG. 14.

Returning to step 122, the user is presented with the option to select between single vision lenses and bifocal/progressive lenses with single vision lenses being indicated at the preferred lenses to choose. FIG. 15 shows an example page that can be displayed in step 122. If the user selects bifocal/progressive lenses he is taken to step 302. If the user selects single vision he proceeds to step 503.

Figure 17:
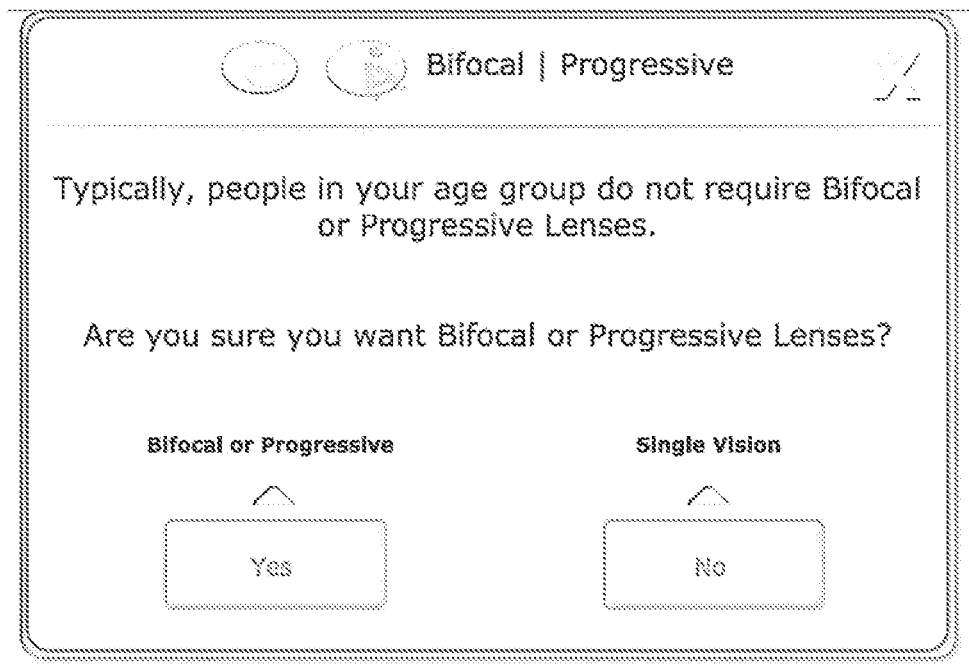
FIG. 17 is a screenshot of a page shown to individuals who chose the non-recommended option in the page shown in FIG. 15.

At step 302 the user is reminded that single vision lenses are recommended. FIG. 17 shows an example page that can be displayed in step 302. If the user again selects bifocal/progressive lenses he is taken to step 126. If however he changes his selection to single vision lenses he is taken to step 503.

Other steps can be included in method 2000, including, among other things, having the user uploading his prescription information, select a frame, and having his photo taken and/or uploaded so he can see how given frames will look on his face.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A device to be used by a human subject comprising:
    (a) a camera apparatus, comprising two cameras spaced a fixed distance apart, wherein each of the two cameras is configured to capture an image of a pair of human eyes on a human face for deriving dimensional measurements of the pair of human eyes on a human face, the device having established through trigonometric methods a ratio of known distance units to a plurality of pixels in the images generated by the two cameras, wherein the device uses the established ratio of known distance units to pixels and the images of the pair of human eyes to measure a distance between said human eyes on said human face, and the device, using a first known distance and a second known distance, having established a horizontal axis and a vertical axis for said camera apparatus, and wherein said first known distance, said second known distance, said horizontal axis, and said vertical axis allow said camera apparatus to compensate for zooming in or out relative to said human subject when imaging;
    (b) a central processing unit and a memory, wherein said memory includes a software; and
    (c) a display;
    wherein said software and said central processing unit are configured to display a digital eyeglass frame on said display screen,
    wherein said software and said central processing unit are configured to render said digital eyeglass frame with one or more of said images of said human face based on said distance between said pair of human eyes.

2. The device of claim 1, wherein the device is configured to receive, from the user, a selected digital eyeglass frame, and the rendering includes the selected digital eyeglass frame.

3. The device of claim 1, wherein the CPU executing the software is configured to compensate and correct for rotation the images of the two cameras.

4. The device of claim 1, wherein said device is configured to receive and store a prescription for said user via said central processing unit in a database, and wherein said device updates said database with said prescription of said user.

5. The device of claim 1, further comprising a microphone and a speaker, wherein the device is configured to receive voice commands from the microphone.

6. The device of claim 1, further comprising a housing having a surface, wherein:
    the two cameras include a first camera configured to capture at least one first image of the pair of human eyes and a second camera configured to capture at least one second image of the pair of human eyes;
    the first camera and the second camera are provided on the same surface of the housing;
    a front face of the first camera and a front face of the second camera are parallel such that the front face of the first camera and the front face of the second camera lie in a reference plane;
    the device includes a microphone and a speaker;
    the central processing unit and software are configured to autodetect the pair of eyes in the captured at least one first image and the captured at least one second image;
    the display is configured to display an interactive user-interface allowing selections from the user to be received;
    an image on the display is configured to change based on selections from the user; and the device is calibrated at a first location, and the at least one first image and the at least one second image are captured at a second location different from the first location.

7. A method for aiding a user in choosing a pair of glasses using a device, the device comprising:
   (i) a camera apparatus for deriving dimensional measurements of a pair of human eyes on a human user, said device having established through trigonometric methods a ratio of known distance units to a plurality of pixels in the images generated by said camera apparatus,
   and wherein the device uses said established ratio of known distance units to pixels and the images of the pair of human eyes to measure a distance between said user's eyes on said user's face, and the device, using a first known distance and a second known distance, having established a horizontal axis and a vertical axis for said camera apparatus, and wherein said first known distance, said second known distance, said horizontal axis and said vertical axis allow said camera apparatus to compensate for zooming in or out relative to said user when imaging;
   wherein the camera apparatus comprises two cameras spaced apart a fixed distance, wherein each of the two cameras is configured to capture an image of a pair of human eyes on a human face for determining the distance between the pair of human eyes;
   (ii) a central processing unit, wherein said central processing unit includes a lens selection software program; and
   (iii) a display;
   wherein said method comprises:
   capturing at least two images of the user using said two cameras;
   determining a distance between the pair of human eyes using the established ratio and the fixed distance;
   determining a properly-fitted frame for said user using said determined distance between the pair of human eyes; and
   displaying said determined properly-fitted frame on the display.

8. The method of claim 7, further comprising:
   receiving, via said device, a selection from said user indicating a lens option.

9. The method of claim 7, further comprising:
   determining said user's identity;
   determining whether said user has a prescribed lens strength in a database of prescription information; and:
   if it is determined that said user has a prescribed lens strength in the database, returning, via the display, a recommend lens;
   if it is determined that said user does not have a prescribed lens strength in the database, providing a first prompt, via the display, to said user to provide a prescription;
      if said user provides a prescribed lens strength, returning, via the display, a recommended lens.

10. The method of claim 9, further comprising:
    displaying, on the display, a plurality of lens materials, wherein the device is configured to receive, from the user, a selected lens material from the plurality of selections of lens materials;
    displaying, on the display, a plurality of lens options, wherein the device is configured to receive, from the user, one or more selected lens options from the plurality of selections of features; and
    displaying, on the display, a total price based on the received selected lens materials and any received one or more selected lens options.

11. A device configured to measure pupil distance comprising, the device comprising:
    a camera apparatus, comprising:
       a first camera configured to capture at least one first image of a human face, the at least one first image including a pair of human eyes on the human face;
       a second camera spaced a fixed distance apart from the first camera and configured to capture at least one second image of the human face, the at least one second image including the pair of human eyes, wherein the first camera and the second camera have parallel optical axes;
    a memory including software and a ratio of known distance units to a plurality of pixels;
    a central processing unit wherein the software and the central processing unit are configured to:
       autodetect the pair of eyes in the captured at least one first image and in the captured at least one second image;
       determine a distance, on the human face, between the pair of eyes based on (i) the captured at least one first image, (ii) the captured at least one second image, (iii) the fixed distance between the first camera and the second camera; and (iv) the ratio, wherein the central processing unity executing the software is configured to compensate for the first camera and/or the second camera zooming in or out in determining the distance; and
       based on the determined distance, determine a rendering of a digital eyeglass frame with the at least one of the captured first or second images;
    a display configured to display the rendering.

12. The device of claim 11, wherein the central processing unit executing the software is configured to autodetect pupils in the pair of human eyes, and the central processing unit is configured to determine the distance between the pupils in the pair of human eyes.

13. The device of claim 11, wherein the central processing unit executing the software is configured to determine the distance using a trigonometric methodology based on the ratio and the fixed distance between the first camera and the second camera.

14. The device of claim 13, wherein the central processing unit executing the software is configured to compensate for the first camera and/or the second camera zooming in and/or out based on the established horizontal axis and the vertical axis.

15. The device of claim 11, wherein the at least one first image and the at least one second image are captured at a first location, and a calibration of the camera apparatus is based on a plurality of images captured at a second location different from the first location.

16. The device of claim 11, wherein a front face of the first camera and a front face of the second camera are parallel such that the front face of the first camera and the front face of the second camera lie in a first reference plane.

17. The device of claim 16, wherein the central processing unit executing the software is configured to:
    capture a reference image that includes a predetermined length extending in a second reference plane, the second reference plane positioned in front of and parallel to the first reference plane; and
    establish a horizontal axis, a vertical axis, and the ratio to correlate a number of pixels in the reference image to the known distance units using: (i) a reference distance between the first reference plane and the second reference plane; (ii) the predetermined length extending in the second reference plane; and (iii) the fixed distance between the first camera and the second camera.

18. The device of claim 11, wherein the central processing unit executing the software is configured to determine the distance between the pair of eyes without requiring:
- a distance between the device and the human face;
- a distance extending in the captured at least one first image or the at least one second image; or
- a calibration device.

19. The device of claim 11, wherein the distance between the first camera and the second camera is less than 120 millimeters.

20. The device of claim 11, wherein:
- the central processing unit executing the software is configured to autodetect facial features in the at least one captured first image and in the at least one captured second image;
- the display is configured to display an interactive user-interface allowing selections from the user to be received; and
- the rendering is configured to change based on selections from the user.

* * * * *